US009019375B1

(12) United States Patent
Whelan et al.

(10) Patent No.: US 9,019,375 B1
(45) Date of Patent: Apr. 28, 2015

(54) TARGET LOCATOR AND INTERCEPTOR IMAGING AND SENSING ASSEMBLY, SYSTEM AND METHOD

(75) Inventors: David A. Whelan, Newport Coast, CA (US); John W. Hunter, Escondido, CA (US)

(73) Assignee: The Boeing Company, Chicago, IL (US)

( * ) Notice: Subject to any disclaimer, the term of this patent is extended or adjusted under 35 U.S.C. 154(b) by 482 days.

(21) Appl. No.: 13/545,978

(22) Filed: Jul. 10, 2012

(51) Int. Cl.
    *H04N 7/18* (2006.01)
    *G01C 23/00* (2006.01)
    *G01C 11/02* (2006.01)

(52) U.S. Cl.
    CPC ............. *G01C 23/00* (2013.01); *G01C 11/02* (2013.01)

(58) Field of Classification Search
    CPC ........... F41H 11/02; F41G 7/00; G01C 23/00; G01C 23/005
    USPC ............ 348/144, 143, 146, 142, 117; 342/63, 342/62, 37, 32; 244/158.1, 3.22; 701/1, 13
    See application file for complete search history.

(56) References Cited

U.S. PATENT DOCUMENTS

| | | | |
|---|---|---|---|
| 4,356,770 A | 11/1982 | Atanasoff et al. | |
| 4,492,166 A | 1/1985 | Purcell | |
| RE32,094 E | 3/1986 | Atanasoff et al. | |
| 4,649,828 A | 3/1987 | Henderson et al. | |
| 4,750,403 A * | 6/1988 | Huber et al. ............ | 89/1.51 |
| 6,270,391 B1 | 8/2001 | Emilsson | |
| 6,666,145 B1 | 12/2003 | Nardone et al. | |
| 6,918,340 B2 | 7/2005 | Daoud | |
| 7,205,932 B2 | 4/2007 | Fiore | |
| 7,415,931 B2 | 8/2008 | McConville et al. | |
| 7,436,493 B2 | 10/2008 | McConville et al. | |
| 7,492,308 B2 | 2/2009 | Benayahu et al. | |
| 8,006,623 B2 | 8/2011 | Dupont et al. | |
| 2004/0107861 A1 | 6/2004 | Nardone et al. | |
| 2004/0231219 A1 | 11/2004 | O'Dwyer | |
| 2005/0030219 A1 | 2/2005 | Friedrich et al. | |
| 2006/0108478 A1* | 5/2006 | Bajuyo et al. ............ | 244/137.4 |
| 2006/0283317 A1 | 12/2006 | Melnychuk et al. | |

(Continued)

OTHER PUBLICATIONS

Jonathan R. Potts et al., "Frisbee™ Aerodynamics", AIAA 2002-3150, American Institute of Aeronautics and Astronautics, 20th AIAA Applied Aerodynamics Conference & Exhibit, Jun. 24-26, 2002, 15 pages.

(Continued)

*Primary Examiner* — Jefferey Harold
*Assistant Examiner* — Jean W Desir

(57) ABSTRACT

There is provided in one embodiment a target locator and interceptor imaging and sensing assembly. The assembly has a disc shaped aerodynamic member configured to spin and self-position in flight, a plurality of pulsed thrusters positioned on the member, and a plurality of imaging and sensing devices positioned along a perimeter of the member. The assembly further has one or more munitions devices coupled to one or more detonators, both being coupled to the aerodynamic member. The assembly further has one or more antenna devices positioned on the member and in communication with a first processor device on the member. The first processor device receives data obtained by the plurality of imaging and sensing devices and wirelessly transmits the data to a second processor device not positioned on the member. The assembly further has a power supply powering the assembly.

25 Claims, 21 Drawing Sheets

(56) References Cited

U.S. PATENT DOCUMENTS

| | | |
|---|---|---|
| 2008/0156221 A1 | 7/2008 | O'Dwyer |
| 2009/0073027 A1 | 3/2009 | McGuire |
| 2010/0026554 A1 | 2/2010 | Longman et al. |
| 2010/0294122 A1 | 11/2010 | Hoadley et al. |
| 2010/0319524 A1 | 12/2010 | Farinella et al. |
| 2014/0138474 A1 * | 5/2014 | Sharpin et al. ............... 244/3.22 |

OTHER PUBLICATIONS

Ralph D. Lorenz, "Flight and Attitude Dynamics Measurements of an Instrumental Frisbee™", Institute of Physics Publishing, Meas. Sci. Technol. 16 (2005) 738-748.

Jonas A. Zukas et al., "Explosive Effects and Applications", Springer, Dec. 1, 2002, Table of Contents and Chapter 7, 14 pages.

* cited by examiner

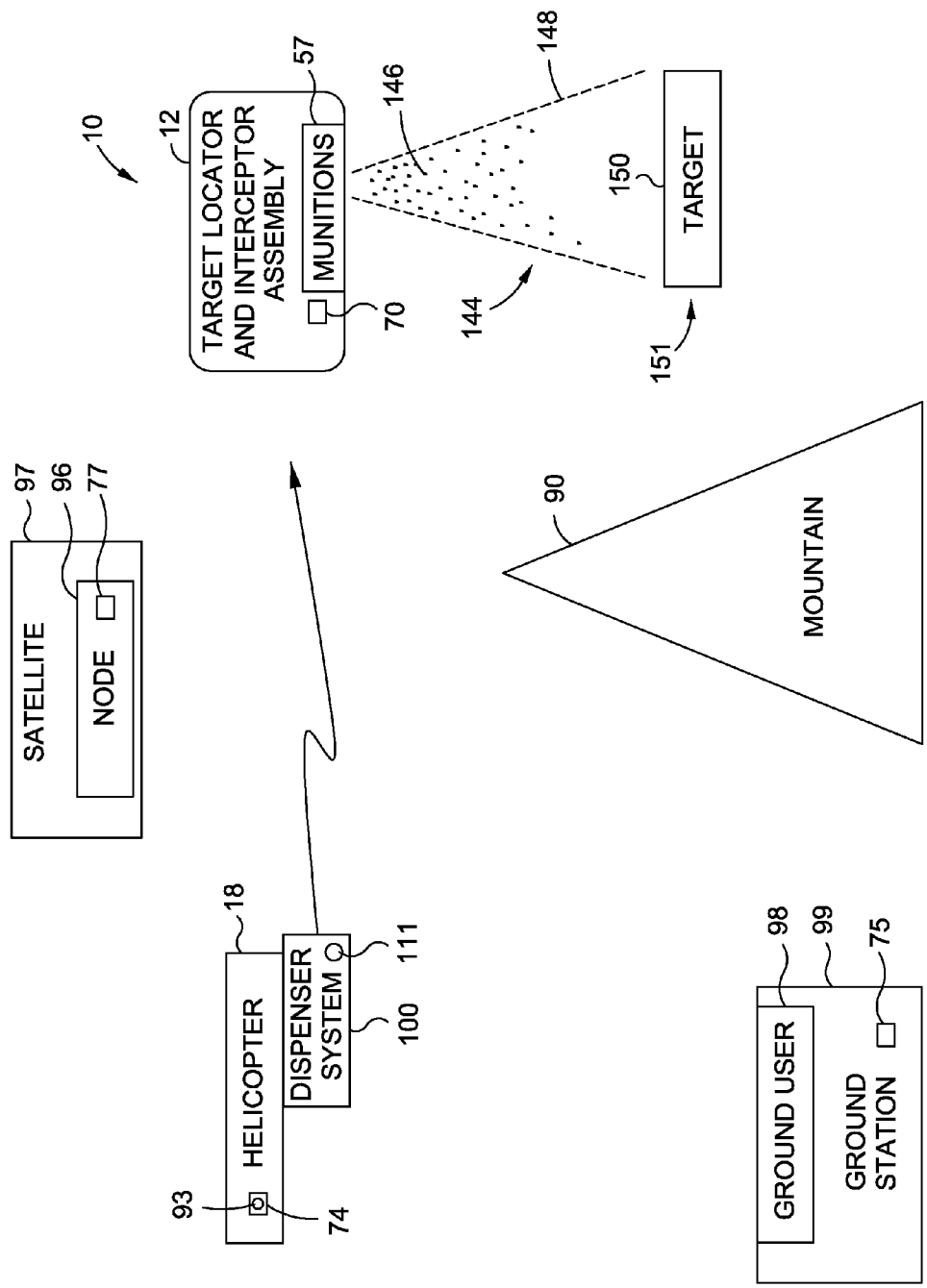

TARGET LOCATOR AND INTERCEPTOR IMAGING AND SENSING ASSEMBLY, SYSTEM AND METHOD

CROSS REFERENCE TO RELATED APPLICATION

This nonprovisional patent application is related to contemporaneously filed U.S. nonprovisional patent application Ser. No. 13/545,973, titled "IMAGING AND SENSING ASSEMBLY, SYSTEM AND METHOD", filed on Jul. 10, 2012, the contents of which are hereby incorporated by reference in its entirety.

BACKGROUND

1) Field of the Disclosure

The disclosure relates generally to target locator and interceptor imaging and sensing devices, systems and methods, and more particularly, to target locator and interceptor imaging and sensing devices, systems and methods for imaging and sensing locations and targets to obtain data for use by flight vehicles, ground vehicles, and the like, and for locating and intercepting targets.

2) Description of Related Art

Access to remote locations by manned or unmanned flight vehicles and ground vehicles may be limited due to geographical, chemical, atmospheric or other constraints. Such conditions may make it difficult to acquire desired data from such locations because it may be difficult for either manned or unmanned vehicles to navigate the approaches to them. To aid in obtaining such data, manned and unmanned flight vehicles and ground vehicles typically use various imaging and sensing devices and systems to obtain and transmit data for purposes such as surveillance, reconnaissance, detecting locations and objects and imaging such locations and objects, and detecting and locating targets and threats and intercepting such targets and threats.

Known sensing and imaging devices and systems may includes both active systems which generate and transmit various types of radiation and develop guidance signals based on reflections obtained from a location, an object, a threat or a target, and passive systems which develop guidance signals from radiation generated directly by the object, threat or target itself. For example, known unmanned vehicles incorporating such known sensing and imaging devices and systems may include unmanned reconnaissance aerial vehicles or drone vehicles. However, for data collection applications requiring low observable or low profile devices, such unmanned vehicles may be limited due to their size and aerodynamic profile.

Moreover, known manned and unmanned vehicles incorporating such known sensing and imaging devices and systems may be limited in their long range capability, fast response time, stability, multiple simultaneous images from different locations, accurate interception, multiple simultaneous intercepts from different locations, and the ability to obtain and transmit high resolution and accurate images of locations, objects, threats or targets. Further, known manned and unmanned vehicles may not have the capability to dispense simultaneously from one vehicle both a device having surveillance and reconnaissance imaging and sensing capabilities and a separate device having object locator imaging and sensing capabilities or having target locator and interceptor imaging and sensing capabilities.

In addition, rocket propelled grenades (RPGs) may pose a significant threat to flight vehicles, such as helicopters, due to the simplicity of the RPGs, the short flight times of the RPGs, and the armor piercing warheads of the RPGs. Further, RPGs may be difficult to jam or decoy as they are unguided after launch. Timelines for a defender may range from less than half a second to at most five seconds. In many cases, more than one RPG may be fired simultaneously at the flight vehicle, such as a helicopter. Known manned and unmanned vehicles incorporating known sensing and imaging devices and systems may be limited in their response time in intercepting RPGs in flight or in discovering RPGs before launch.

Accordingly, there is a need in the art for improved target locator and interceptor imaging and sensing devices, systems and methods for obtaining data on locations, objects, threats and targets, and for locating and intercepting targets and threats, that provide advantages over known devices, systems and methods.

SUMMARY

This need for an improved target locator and interceptor imaging and sensing device, system and methods for obtaining data on locations, objects, threats and targets, and for locating and intercepting targets and threats, is satisfied. As discussed in the below detailed description, embodiments of such improved device, system and method may provide significant advantages over existing devices, systems and methods.

In one embodiment there is provided a target locator and interceptor imaging and sensing assembly. The target locator and interceptor imaging and sensing assembly comprises a disc shaped aerodynamic member configured to spin and self-position in flight. The target locator and interceptor imaging and sensing assembly further comprises a plurality of pulsed thrusters positioned on the aerodynamic member. The target locator and interceptor imaging and sensing assembly further comprises a plurality of imaging and sensing devices positioned along a perimeter of the aerodynamic member. The target locator and interceptor imaging and sensing assembly further comprises one or more munitions devices coupled to one or more detonators, the one or more munitions devices and the one or more detonators being coupled to the aerodynamic member. The target locator and interceptor imaging and sensing assembly further comprises one or more antenna devices positioned on the aerodynamic member and in communication with a first processor device on the aerodynamic member. The first processor device receives data obtained by the plurality of imaging and sensing devices and wirelessly transmits the data to a second processor device not positioned on the aerodynamic member. The target locator and interceptor imaging and sensing assembly further comprises a power supply powering the target locator and interceptor imaging and sensing assembly.

In another embodiment there is provided a target locator and interceptor imaging and sensing assembly dispenser system. The dispenser system comprises a dispenser device having a plurality of storage slots extending from a position near a central portion of the dispenser device to an external surface of the dispenser device. At least one storage slot is shaped to house an imaging and sensing assembly having a disc shaped aerodynamic member. The dispenser system further comprises a communication system coupled to the dispenser device and configured to communicate data between the dispenser device and the imaging and sensing assembly. The dispenser system further comprises one or more ejection devices to eject the imaging and sensing assembly out of the dispenser device.

In another embodiment there is provided a method for locating and intercepting a target. The method comprises ejecting a surveillance and reconnaissance imaging and sensing assembly from a dispenser system attached to a structure. The surveillance and reconnaissance imaging and sensing assembly comprises a disc shaped aerodynamic member. The method further comprises spinning the disc shaped aerodynamic member while in flight. The method further comprises obtaining data from the plurality of imaging and sensing devices on the surveillance and reconnaissance imaging and sensing assembly. The method further comprises transmitting the data to a second processor device for processing to obtain processed data. The method further comprises identifying a target from the processed data. The method further comprises detecting the target with one or more sensor devices of the dispenser system. The method further comprises ejecting one or more target locator and interceptor imaging and sensing assemblies from the dispenser system toward the target. The method further comprises locating and intercepting the target with the one or more target locator and interceptor imaging assemblies.

In another embodiment there is provided a method for locating and intercepting a target. The method comprises rotating a dispenser system attached to a structure. The dispenser system houses a plurality of target locator and interceptor imaging and sensing assemblies. The method further comprises detecting a target with one or more sensor devices of the dispenser system. The method further comprises ejecting one or more of the target locator and interceptor imaging and sensing assemblies from the dispenser system toward the target. The method further comprises locating and intercepting the target with the one or more target locator and interceptor imaging assemblies.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIGS. 23A-23B are illustrations of schematic diagrams showing operation and data transmission by embodiments of the imaging and sensing assembly launched from a dispenser system of the disclosure;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Now referring to the Figures, in one embodiment of the disclosure, there is provided an imaging and sensing assembly 10 (see FIGS. 1-7). FIGS. 1-5 show one embodiment of the imaging and sensing assembly 10 comprising a surveillance and reconnaissance imaging and sensing assembly 11. FIGS. 6-10 show another embodiment of the imaging and sensing assembly 10 comprising a target locator and interceptor imaging and sensing assembly 12.

Figure 1:
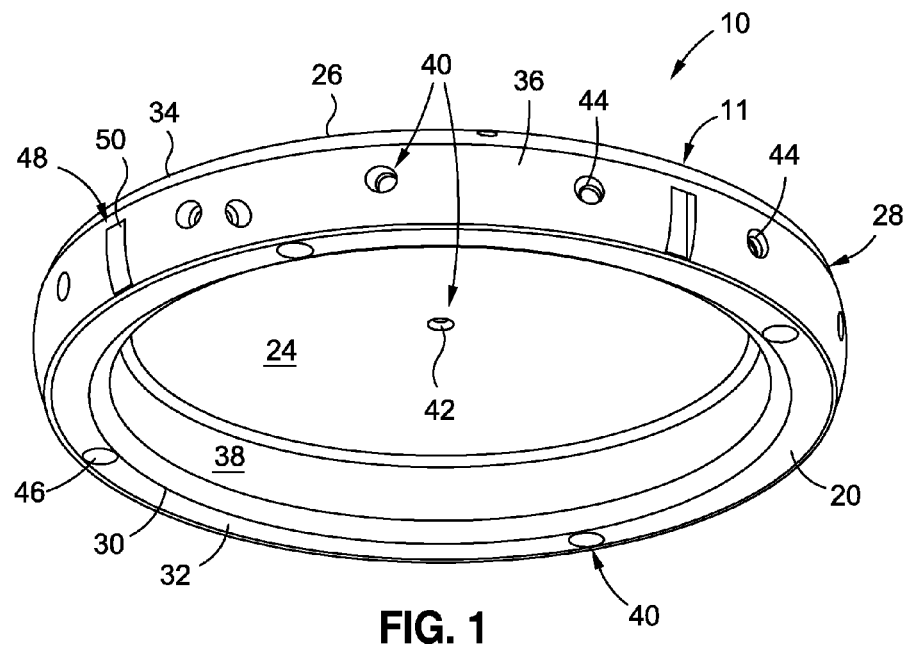
FIG. 1 is an illustration of a bottom perspective view of one of the embodiments of an imaging and sensing assembly of the disclosure.
Figure 2:
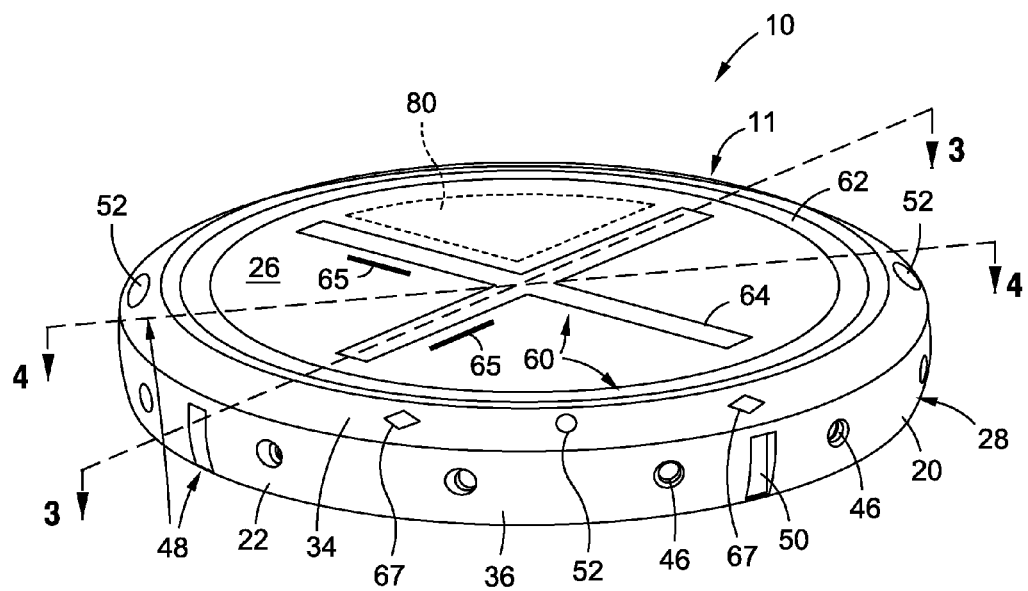
FIG. 2 is an illustration of a top perspective view of the imaging and sensing assembly of FIG. 1.
Figure 3:
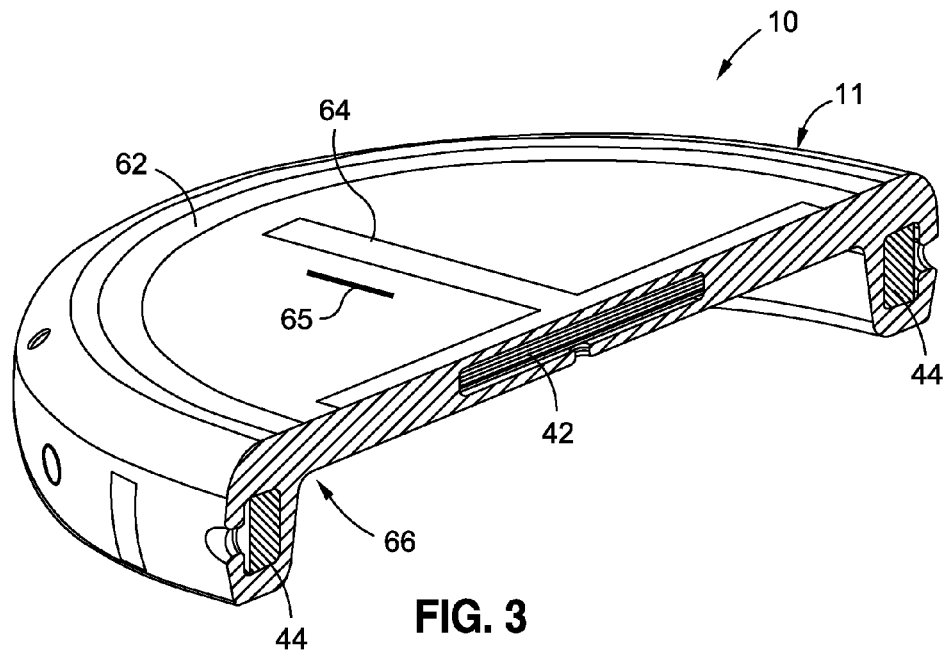
FIG. 3 is an illustration of a cross-sectional perspective view of the imaging and sensing assembly taken along lines 3-3 of FIG. 2.
Figure 4:
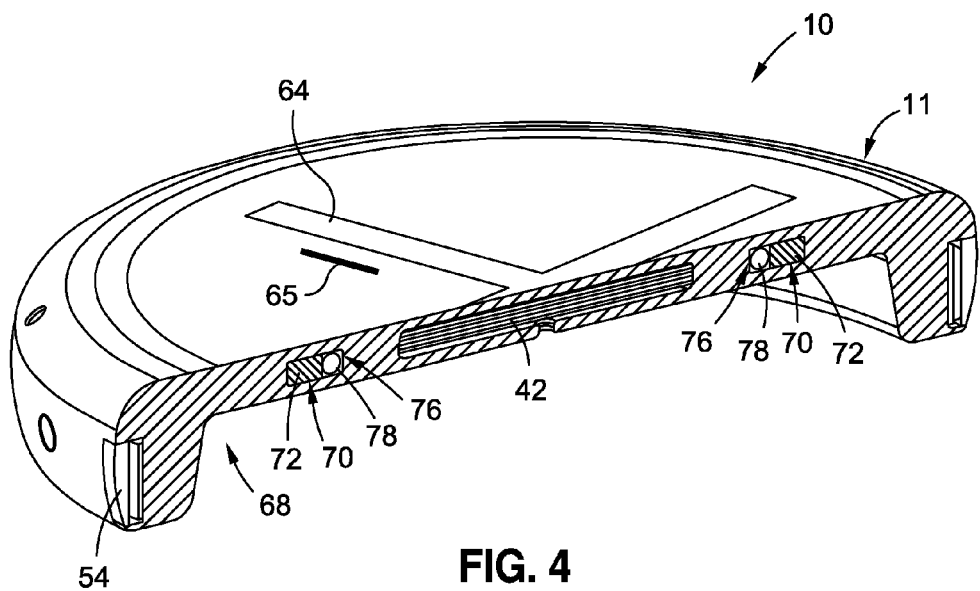
FIG. 4 is an illustration of a cross-sectional perspective view of the imaging and sensing assembly taken along lines 4-4 of FIG. 2.
Figure 5:
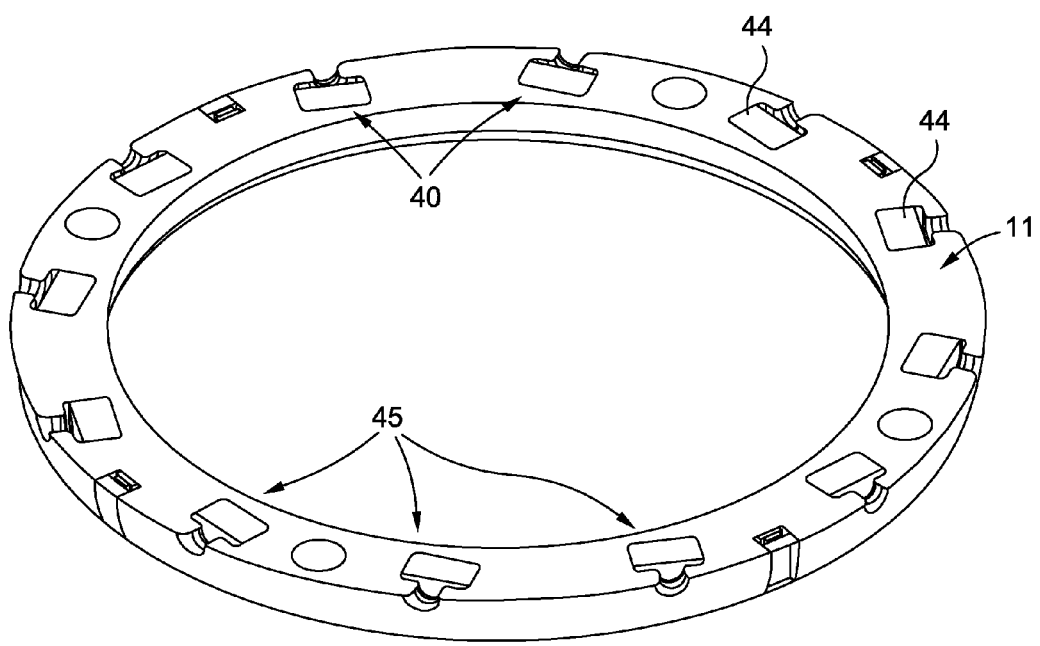
FIG. 5 is an illustration of a top cut-away perspective view of the imaging and sensing assembly of FIG. 1 showing radial thrusters in an offset angle position.

Referring to the imaging and sensing assembly 10, for example, the surveillance and reconnaissance imaging and sensing assembly 11, is shown in FIGS. 1-5, FIG. 1 is an illustration of a bottom perspective view of the imaging and sensing assembly 10 comprising the first surveillance and reconnaissance imaging and sensing assembly 11. FIG. 2 is an illustration of a top perspective view of the imaging and sensing assembly 10 of FIG. 1. FIG. 3 is an illustration of a cross-sectional perspective view of the imaging and sensing assembly 10 taken along lines 3-3 of FIG. 2. FIG. 4 is an illustration of a cross-sectional perspective view of the imaging and sensing assembly 10 taken along lines 4-4 of FIG. 2. FIG. 5 is an illustration of a top cut-away perspective view of the imaging and sensing assembly 10 of FIG. 1 showing radial thrusters 44 in an offset angle position 45.

Figure 6:
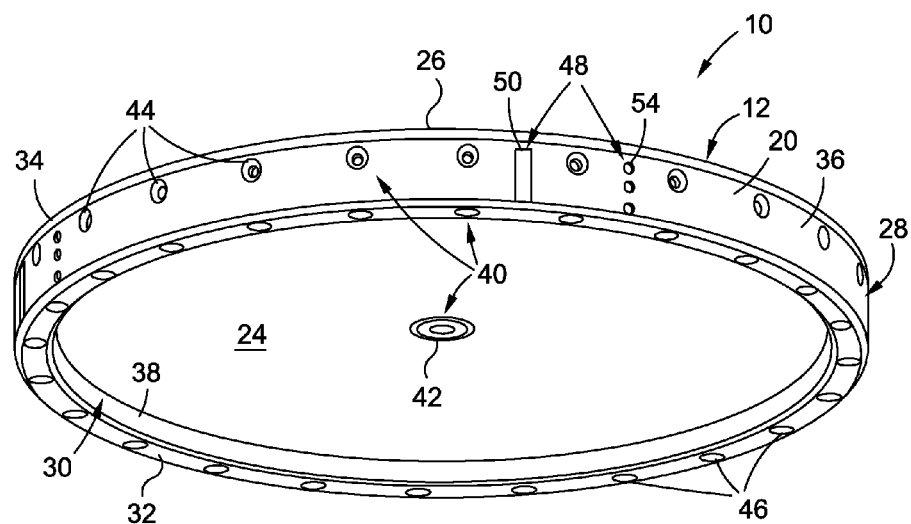
FIG. 6 is an illustration of a bottom perspective view of another one of the embodiments of an imaging and sensing assembly of the disclosure, in the form of a target locator and interceptor imaging and sensing assembly.
Figure 7:
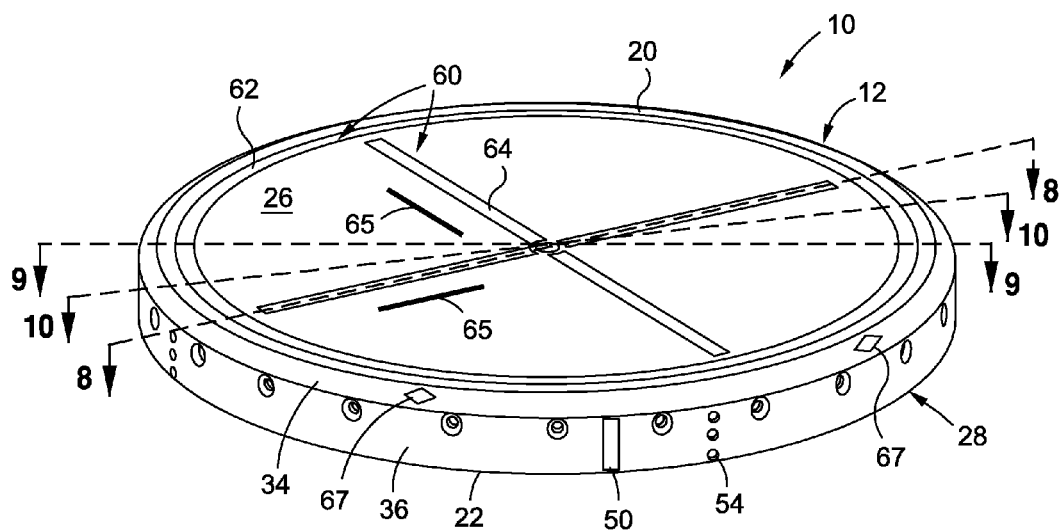
FIG. 7 is an illustration of a top perspective view of the target locator and interceptor imaging and sensing assembly of FIG. 6.
Figure 8:
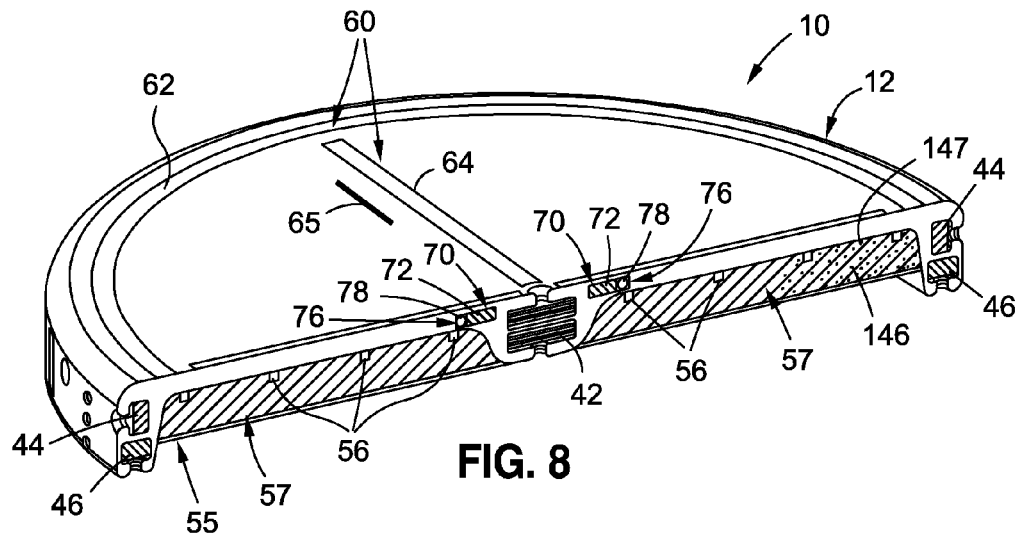
FIG. 8 is an illustration of a cross-sectional perspective view of the target locator and interceptor imaging and sensing assembly taken along lines 8-8 of FIG. 7.
Figure 9:
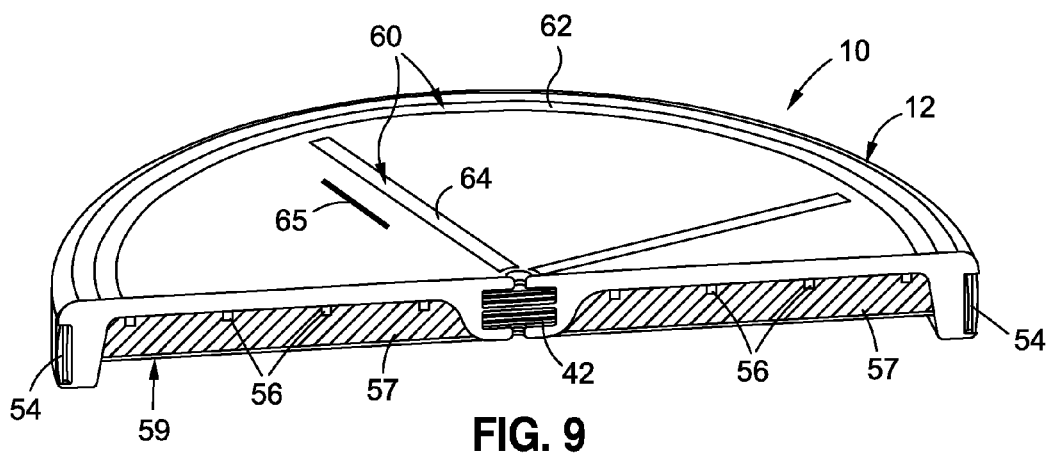
FIG. 9 is an illustration of a cross-sectional perspective view of the target locator and interceptor imaging and sensing assembly taken along lines 9-9 of FIG. 7.
Figure 10:
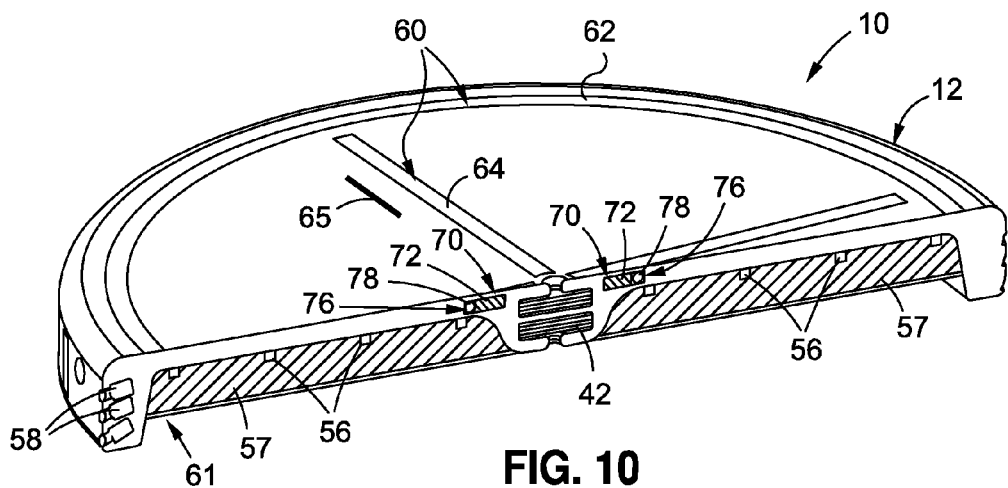
FIG. 10 is an illustration of a cross-sectional perspective view of the target locator and interceptor imaging and sensing assembly taken along lines 10-10 of FIG. 7.

Referring to the imaging and sensing assembly 10, for example, the target locator and interceptor imaging and sensing assembly 12, is shown in FIGS. 6-10, FIG. 6 is an illustration of a bottom perspective view of the imaging and sensing assembly 10 comprising the target locator and interceptor imaging and sensing assembly 12. FIG. 7 is an illustration of a top perspective view of the target locator and interceptor imaging and sensing assembly 12 of FIG. 6. FIG. 8 is an illustration of a cross-sectional perspective view of the target locator and interceptor imaging and sensing assembly taken along lines 8-8 of FIG. 7. FIG. 9 is an illustration of a cross-sectional perspective view of the target locator and interceptor imaging and sensing assembly taken along lines 9-9 of FIG. 7. FIG. 10 is an illustration of a cross-sectional perspective view of the target locator and interceptor imaging and sensing assembly taken along lines 10-10 of FIG. 7;

The imaging and sensing assembly 10 comprises an aerodynamic member 20 (see FIGS. 1, 6) preferably having a disc shape 22 (see FIGS. 2, 7). The aerodynamic member 20 is configured to spin and self-position in flight. The disc shape 22 is preferably an airfoil in cross-section. The airfoil shape allows the aerodynamic member 20 to fly by generating lift as it moves through the air while rotating. As shown in FIGS. 1, 6, the aerodynamic member 20 has a first side 24, a second side 26, a body portion 28, and a rim portion 30. As further shown in FIGS. 1, 6, the rim portion 30 comprises a first end 32, a second end 34, a perimeter portion 36, and an interior portion 38.

As further shown in FIGS. 1, 6, the imaging and sensing assembly 10 further comprises a plurality of pulsed thrusters 40 positioned on the aerodynamic member 20. The plurality of pulsed thrusters 40 may comprise one or more central thrusters 42 (see FIGS. 1, 6), one or more radial thrusters 44 (see FIGS. 1, 6), one or more torque thrusters 46 (see FIGS. 1,6), a combination thereof, or another suitable pulsed thruster 40. As shown in FIG. 3, the radial thrusters 44 may be embedded in the imaging and sensing assembly 10 at sectional central portion 66. As shown in FIG. 8, the radial thrusters 44 and the torque thrusters 46 may be embedded in the imaging and sensing assembly 10 at sectional central portion 55.

FIG. 5 is an illustration of a sectional perspective view of one of the embodiments of the imaging and sensing assembly 10 showing radial thrusters 44 at an offset angle position 45. As shown in FIG. 5, the radial thrusters 44 are preferably offset five (5) degrees to fifteen (15) degrees at the offset angle position 45 to sustain spin of the aerodynamic member 20 and to augment horizontal thrust for the aerodynamic member 20 in order to keep the imaging and sensing assembly 10 stabilized while in flight.

As further shown in FIGS. 1, 6, the imaging and sensing assembly 10 further comprises a plurality of imaging and sensing devices 48 positioned along the perimeter portion 36 of the rim portion 30 of the aerodynamic member 20. The plurality of imaging and sensing devices 48 may comprise one dimensional imaging and sensing devices, two dimensional imaging and sensing devices, camera imaging and sensing devices including push broom optics with focal plane arrays, such as push broom optics or cameras with linear focal plane arrays, camera imaging and sensing devices including long term ground surveillance camera imaging and sensing devices, line scan imaging devices including line scan imaging optical cameras, optical and infrared imaging and sensing devices, radar sensing devices, laser scanning devices, a combination thereof, or another suitable imaging and sensing device.

FIGS. 1 and 7 show an optical/IR (infrared) imaging and sensing device 50, in the form of optical/IR sensors, on the perimeter portion 36 of the rim portion 30. FIG. 2 shows a camera imaging and sensing device 52, in the form of a long term ground surveillance camera imaging and sensing device, on the perimeter portion 36 of the rim portion 30. FIG. 4 shows a camera imaging and sensing device 54, such as, for example, in the form of push broom optics with a linear focal plane array at sectional central portion 68. FIG. 9 shows the camera imaging and sensing device 54, such as, for example, in the form of push broom optics with a linear focal plane array at sectional central portion 59. FIG. 10 shows camera imaging devices 58 in the form of standard cameras with optics and focal planes at sectional central portion 61. The plurality of imaging and sensing devices 48, such as the optical/IR sensors, or laser scanning may be used to detect proximity of an object 94 (see FIG. 14) or proximity of a target 150 (see FIG. 17).

As used herein, an "imaging and sensing device" means a device that converts an optical image into an electronic signal. As used herein, a "line scan imaging device" means a device or ssystem capable of acquiring images from continuous or cylindrical surfaces and made pixel line by pixel line.

For "push broom optics with focal plane arrays", as used herein, "push broom optics" means using push broom cameras or imaging devices to gather a complete spectrum of each point on one spatial line area such that an object is scanned one line or a few lines at a time. To image the whole object, either the object or the camera must move. Push broom optics can be effective for airborne applications as the steady movement of the flight vehicle or aircraft provides the constant scanning of the ground surface. As used herein "focal plane arrays" mean detectors which consist of a linear or two-dimensional matrix of individual elements that are used at the focus of imaging systems, including linear focal plane arrays and area focal plane arrays. Linear focal plane arrays consist of a single line of pixels. Area focal plane arrays consist of rows and columns of pixels. Spectral ranges for the focal plane arrays may comprise visible, infrared (IR) such as near-infrared (NIR), mid-infrared, far-infrared (FIR), ultraviolet (UV), microwave, or another suitable spectral range. Visible light has wavelengths from 400 nm to 750 nm. NIR light has wavelengths from 750 nm to 2.5 μm, mid-infrared light has wavelengths from 2.5 μm to 10 μm, and FIR light has wavelengths from 10 μm to 1 mm. Ultraviolet light or UV light has wavelengths from 10 nm to 400 nm. Focal plane arrays are particularly useful for aerial reconnaissance, aerial mapping, machine vision, measurement applications, and other suitable uses.

As further shown in FIGS. 2, 7, the imaging and sensing assembly 10 further comprises one or more antenna devices 60 positioned on the aerodynamic member 20. Preferably, the one or more antenna devices 60 are positioned on the second side 26 of the aerodynamic member 20. The one or more antenna devices 60 may comprise one or more radio frequency antenna devices, such as, for example, radio frequency proximity fuse antenna devices 62 (see FIGS. 2, 7), radio frequency antenna devices for receiving and transmitting data communications, including, for example, global positioning system (GPS) radio frequency antenna devices 64, or a combination thereof, or another suitable antenna device 60.

The radio frequency proximity fuse antenna device 62, as shown in FIG. 7, allows the target locator and interceptor imaging and sensing assembly 12 to detonate with detonators 56 (see FIGS. 8-10) at the correct moment as it moves above or below an incoming target 150 (see FIG. 17), such as a rocket propelled grenade (RPG). A Doppler shift off the target 150 may be recognized and used to determine that the target 150 is real and moving at a high speed before the target locator and interceptor imaging and sensing assembly 12 will detonate. The global positioning system (GPS) radio frequency antenna devices 64 (see FIG. 8), or alternatively, a laser seeker (not shown), may be used to direct the target locator and interceptor imaging and sensing assembly 12 in the event one wants to intercept or disable a target 150 prior to its launch.

The one or more antenna devices 60 are preferably in communication with a first processor device 70 (see FIGS. 4, 8) positioned on or in the aerodynamic member 20. Preferably, as shown in FIGS. 4, 8, the first processor device 70 may be embedded within the body portion 28 (see FIGS. 1, 6) of the aerodynamic member 20. The first processor device 70 may comprise, for example, a microprocessor, a computer device having one or more microprocessor central processing units (CPUs), a microcomputer device, a computer with a guidance, navigation and control (GNC) controller, a combination thereof, or another suitable processor device. The processor device 70 may be configured to receive information and provide control to the plurality of pulsed thrusters 40 to activate and deactivate the plurality of pulsed thrusters 40 in order to reposition the imaging and sensing assembly 10 during flight.

As shown in FIGS. 4, 8, the first processor device 70 may comprise a microprocessor computer with a GNC controller 72. The first processor device 70 receives data 84 (see FIGS. 22, 23) obtained by the plurality of imaging and sensing devices 48 and wirelessly transmits the data 84 (see FIGS. 22, 23A) to a second processor device 74 (see FIGS. 14-16). The second processor device 74 may be located in or on a separate flight vehicle 16 (see FIGS. 14-16), such as a helicopter 18 (see FIGS. 14-16 and FIGS. 22, 23A). Alternatively, the second processor device 74 or a third processor device 75 (see FIGS. 22, 23A) may be located on or in a structure 14 on the ground, such as a separate ground station 99 (see FIGS. 22, 23A) or ground vehicle (not shown) for use by a ground user 98 (see FIGS. 22, 23A), or on or in a separate aircraft or other location configured to house a processor device, such as a computer or microprocessor. Alternatively, a processor communication transmission node 96 (see FIGS. 22, 23A), such as on a satellite 97 (see FIGS. 22, 23A), may be used to receive data 82 (see FIGS. 22, 23A) processed by the first processor device 70 on the imaging and sensing assembly 10 and may process the data 82 with a fourth processor device 77. The processor communication transmission node 96 may then relay data 89 (see FIGS. 22, 23A) to the helicopter 18 having the second processor device 74 for processing the data 89. In addition, the processor communication transmission node 96 may then relay data 91 (see FIGS. 22, 23A) to the ground station 99 (see FIGS. 22, 23A) or ground location having the second processor device 74 or a separate third processor device 75 (see FIGS. 22, 23A) for processing the data 91.

The second processor device 74, the third processor device 75, and the fourth processor device 77 may comprise, for example, computers such as laptop computers, desktop computers, and notebook computers, a microprocessor, a computer device having one or more microprocessor central processing units (CPUs), a microcomputer device, handheld computer devices such as handheld tablet computers and mobile smartphones, a computer with a guidance, navigation and control (GN&C) controller, a combination thereof, or another suitable processor device.

The data 82, 84, 86 (see FIGS. 22, 23A) obtained by the plurality of imaging and sensing devices 48 may comprise a plurality of images 92 (see FIGS. 22, 23A) including video images and high resolution streaming optical/IR (infrared) video images, raw data, radar images, microwave images, a combination thereof, or other suitable data. The data preferably comprises data relating to an object 94 (see FIG. 22), data relating to a location 95 (see FIG. 22) of the object 94, data relating to a location 95 only, data relating to a target (see FIG. 23A), data relating to a location 151 (see FIG. 23A) of the target 150, or data relating to a location 151 only. The object 94 may comprise flight vehicles including unmanned and manned air vehicles, ground vehicles, ground structures including building, campsites, ground stations, and other ground structures, flying devices, projectiles, radar towers and other structures having telecommunications devices, transmission devices and/or signal devices, people, birds, chemical materials, nuclear materials, improvised explosive devices (IEDs), and other suitable objects. The target 150 may comprise a rocket-propelled grenade (RPG) which is a shoulder-fired weapon that fires rockets equipped with an explosive warhead, an automatic weapon, a .50 caliber machine gun, a bomb, a missile, a rocket, a shell, a grenade, an explosive device including an improvised explosive device (IED), an antiaircraft system or weapon, a projectile, a flight vehicle including an unmanned and a manned air vehicle, a ground vehicle, a ground structure including a building, a campsite, a base camp, a ground station, and other ground structures, a flying device, a radar tower and other structures having telecommunications devices, transmission devices and/or signal devices, chemical materials, nuclear materials, and other suitable targets.

As further shown in FIGS. 4, 8, the imaging and sensing assembly 10 further comprises a power supply 76 for powering the imaging and sensing assembly 10. The power supply 76 may comprise one or more batteries 78 (see FIG. 4) such as lithium ion batteries, thermal batteries, zinc air batteries, lithium thionyl chloride batteries. The power supply 76 may also comprise one or more solar panels 80 (see FIG. 2) comprising solar cells or solar modules, where the solar cells or solar modules may comprise wafer-based crystalline silicon cells or thin-film cells based on cadmium telluride or silicon, or another suitable solar cell or solar module material, or high efficiency multi junction solar cells. The power supply 76 may also comprise fuel cells, an internal combustion engine powered generator system (not shown), or another suitable power supply. As shown in FIG. 2, the surveillance and reconnaissance imaging and sensing assembly 11 may have additional solar panels 80 mounted on the second side 26 in order to provide long term (months or more) surveillance of areas of interest.

As further shown in FIG. 8, the target locator and interceptor imaging and sensing assembly 12 may comprise one or more detonators 56 coupled to one or more munitions devices 57, such as in the form of pellets 146 (see also FIGS. 17-19) in a matrix material 147. The pellets 146 are preferably made of a metal material and may be a high density metal such as tungsten or tungsten alloys or another suitable high density metal, or a lower density metal such as steel, copper, aluminum, titanium or another suitable low density metal. The matrix material 147 may comprise an explosive material such as TNT (trinitrotoluene), HMX (octogen), RPX (cyclotrimethylenetrinitramine), and other suitable explosive materials. The one or more munitions devices may further comprise a plurality of metal spheres (BB's), a shaped charge, one or more explosively formed penetrators (EFPs), one or more electro-shock devices such as a TASER device (TASER is a registered trademark of Taser International, Inc. of Scottsdale, Ariz.), and one or more non-lethal materials such as 2-chlorobenzalmalononitrile (tear gas) gas or powder, pepper spray, chloroacetophenone gas or powder, and dye packets.

Figure 17:
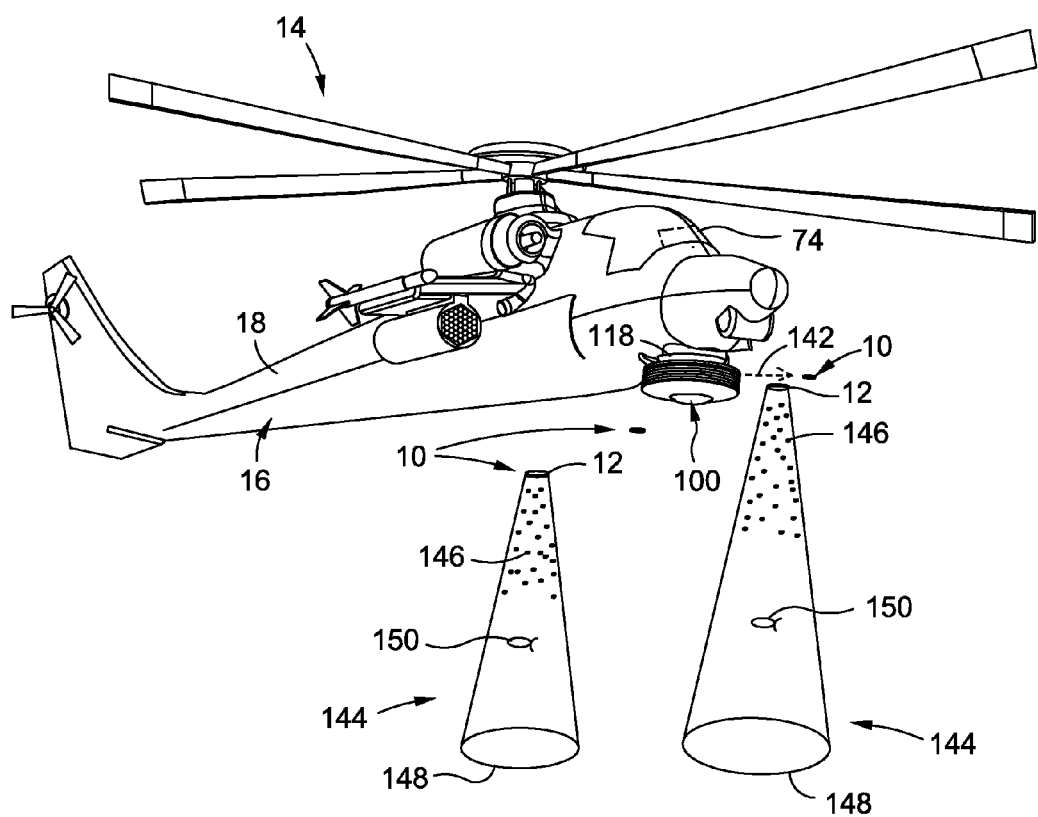
FIG. 17 is an illustration of a front perspective view of a flight vehicle structure incorporating one of the embodiments of an imaging and sensing assembly dispenser system showing a first target position by embodiments of an imaging and sensing assembly of the disclosure, in the form of a target locator and interceptor imaging and sensing assembly.
Figure 18:
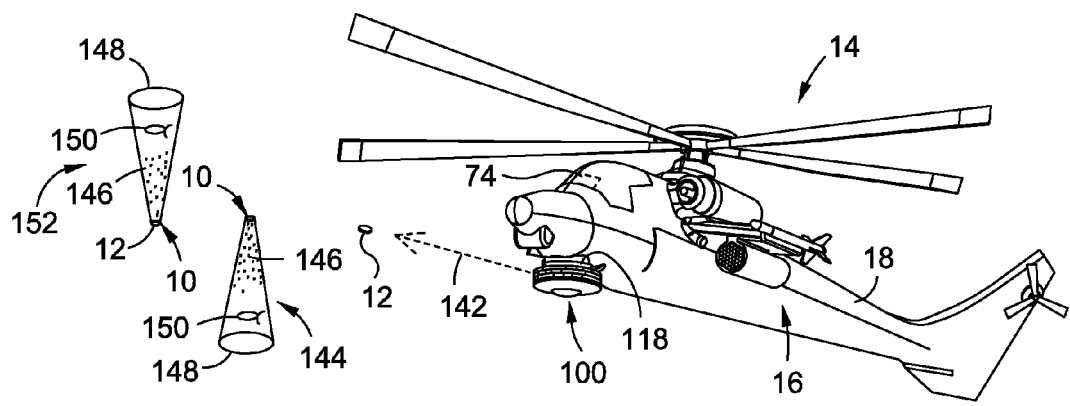
FIG. 18 is an illustration of a front perspective view of the flight vehicle structure with the imaging and sensing assembly dispenser system of FIG. 17 showing a first target position and a second target position by embodiments of an imaging and sensing assembly of the disclosure, in the form of a target locator and interceptor imaging and sensing assembly.
Figure 19:
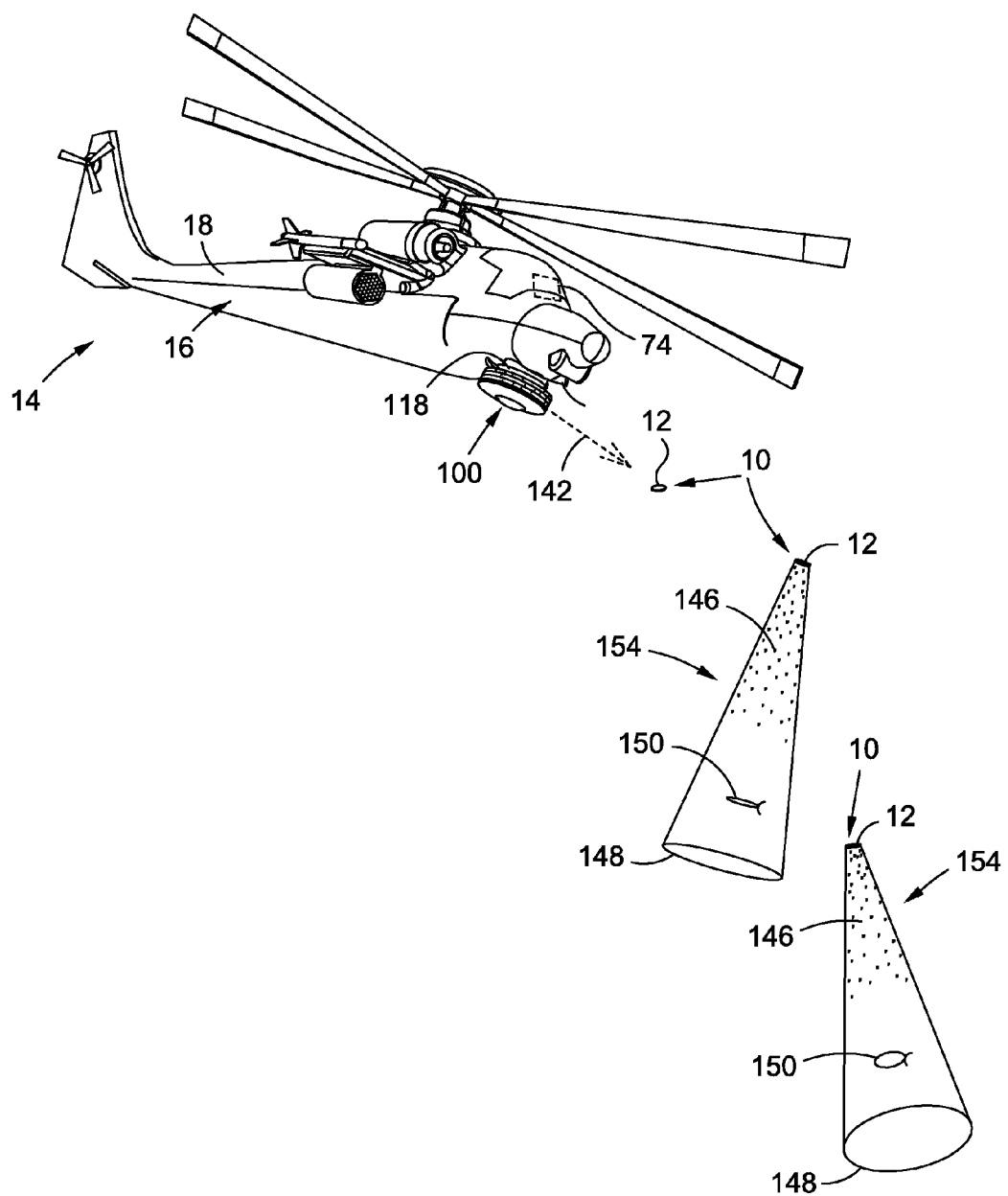
FIG. 19 is an illustration of a front perspective view of the flight vehicle structure with the imaging and sensing assembly dispenser system of FIG. 17 showing a third target position by embodiments of an imaging and sensing assembly of the disclosure, in the form of a target locator and interceptor imaging and sensing assembly.

As shown in FIGS. 17-19, when the pellets 146 are dispensed from the target locator and interceptor imaging and sensing assembly 12, they may be dispensed in a target zone 148, such as for example, over the target 150 in a first target position 144 (see FIG. 17), under the target 150 in a second target position 152 (see FIG. 18) or sideways or at an angle over the target 150 in a third target position 154 (see FIG. 17).

Thus, in one embodiment, as discussed above, there is provided a target locator and interceptor imaging and sensing assembly 12 (see FIGS. 6-10). The target locator and interceptor imaging and sensing assembly 12 comprises a disc shaped aerodynamic member 20 configured to spin and self-position in flight. The target locator and interceptor imaging and sensing assembly 12 further comprises a plurality of pulsed thrusters 40 positioned on the aerodynamic member 20. The target locator and interceptor imaging and sensing assembly 12 further comprises a plurality of imaging and sensing devices 48 positioned along a perimeter of the aerodynamic member 20. The target locator and interceptor imaging and sensing assembly 12 further comprises one or more munitions devices 57 coupled to one or more detonators 56 where the one or more munitions devices 57 and the one or more detonators 56 are coupled to the aerodynamic member 20 and are preferably embedded within the aerodynamic member 20. The target locator and interceptor imaging and sensing assembly 12 further comprises one or more antenna devices 60 positioned on the aerodynamic member 20 and in communication with a first processor device 70 on the aerodynamic member. The first processor device 70 receives data obtained by the plurality of imaging and sensing devices 48 and wirelessly transmits the data to a second processor device 74 not positioned on the aerodynamic member 20. The target locator and interceptor imaging and sensing assembly 12 further comprises a power supply 76 for powering the target locator and interceptor imaging and sensing assembly 20.

Figure 14:
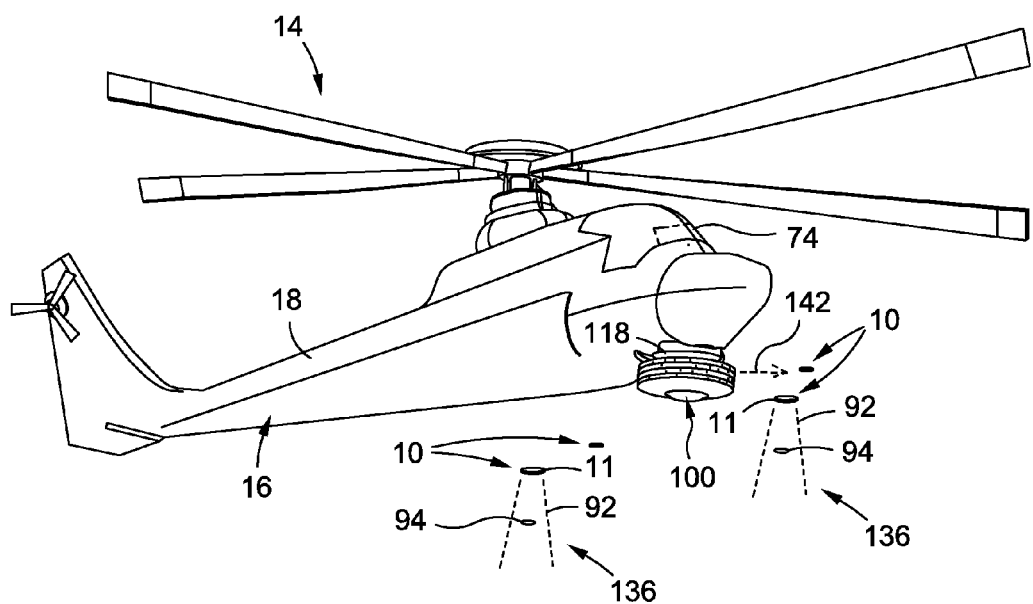
FIG. 14 is an illustration of a front perspective view of a flight vehicle incorporating one of the embodiments of an imaging and sensing assembly dispenser system showing a first object position by embodiments of an imaging and sensing assembly of the disclosure.

The advantageous features of the imaging and sensing assembly 10, such as the surveillance and reconnaissance imaging and sensing assembly 11, shown in FIGS. 1-5 and the target locator and interceptor imaging and sensing assembly 12, shown in FIGS. 6-10, may include performing surveillance and reconnaissance to obtain data and other information regarding identified objects 94 (see FIG. 22) and locations 95 (see FIG. 22) of the objects 94 or identified targets 150 (see FIG. 23A) and locations 151 (see FIG. 23) of the targets 150, that are hidden from direct line of sight to a flight vehicle 16 (see FIGS. 14, 17), such as a helicopter 18 (see FIGS. 14, 17). The information may be useful to a user to determine specific locations 95, 151, and to determine the type and detail of objects 94 or targets 150 and to gather information about the desired location 95, 151 before the flight vehicle 16 (see FIGS. 14, 17) or ground vehicle enters the desired location 95, 151. The imaging and sensing assembly 10 may provide high resolution streaming video which the flight vehicle 16 occupants and crew and/or the ground users 98 in the ground station 99 (see FIGS. 22, 23A) or ground vehicle can monitor. The flight vehicle 16 occupants or crew and the ground users 98 in the ground station 99 or ground vehicle may also control the imaging and sensing assembly 10 in real time using flat panels (not shown) and joysticks (not shown). The high resolution streaming video may be replayed and analyzed both locally and relayed elsewhere for additional analysis. Since the imaging and sensing assembly 10 may be directed to precise close-up locations, it may deliver more accurate images 92 (see FIGS. 22, 23A) than a sensor located on the flight vehicle 16 (see FIG. 14), ground station 99 (see FIG. 22) or ground vehicle, or other structure 14 several miles or kilometers away.

Push broom optics, such as push broom optics with a linear focal plane array, may allow for obtaining panoramic views of regions of interest. The disc shaped aerodynamic member 20 (see FIG. 1) may spin at several hundred Hz (hertz). In addition, the imaging and sensing assembly 10 may provide video of objects 94 or targets 150 out of view of a flight vehicle 16 (see FIGS. 14, 17) and/or occupants of the flight vehicle 16, since the imaging and sensing assembly 10 is capable of flying over ridge lines and eliminating terrain masking. The imaging and sensing assembly 10 may use push broom optics, such as push broom optics with a linear focal plane array, to maximize the effective pixels for high resolution. By virtue of a high spin rate (>100 Hz (Hertz)), a modest focal plane array with maximum pixels in the vertical dimension may be used to obtain an effectively massive focal plane array. This may be done both in the visible and the IR (infrared) spectrum. In addition, the imaging and sensing assembly 10 may fly to precise locations using a GPS (global positioning system) or laser directed homing. In the event a precise location has been designated beforehand or is being designated in real time with a laser, the imaging and sensing assembly 10 may fly accurately to the location. A GPS receiver may be used for homing as well as determining and relaying accurate locations and object information. A guidance, navigation and control (GNC) controller 72 (see FIGS. 4, 8) may include GPS and laser designation to allow remote users to direct the imaging and sensing assembly 10. The imaging and sensing assembly 10 may provide high resolution images of the corridors it flies into as directed.

In addition, the imaging and sensing assembly 10 may be used as a ground based sensor complete with camera imaging and sensing devices 52, including long term ground surveillance camera imaging and sensing devices (see FIG. 2), acoustic sensors 65 (see FIGS. 2, 7), radiation monitors 67 (see FIGS. 2, 7), and other useful detectors such as, for example, chemical, seismic, and magnetic sensors, or other suitable sensors, that may be deployed for long term monitoring. In one embodiment, the ground based imaging and sensing assembly 10 may rely on solar panels 80 (see FIG. 2) for long term power enabling its use for months or more.

Moreover, the surveillance and reconnaissance imaging and sensing assembly 11 may be used for delivery of emergency supplies including medical supplies, ammunition, plasma, antibiotics and food. The delivery version of the surveillance and reconnaissance imaging and sensing assembly 11 may have similar dimensions (such as 10 inches or greater) as the target locator and interceptor imaging and sensing assembly 12, may potentially be capable of carrying several pounds of vital payload, and may be directed to soft land in locations with high accuracy.

The dimensions of the surveillance and reconnaissance imaging and sensing assembly 11 may be smaller than the dimensions of the target locator and interceptor imaging and sensing assembly 12, and the surveillance and reconnaissance imaging and sensing assembly 11 may also be lighter in weight than the target locator and interceptor imaging and sensing assembly 12. In addition, the surveillance and reconnaissance imaging and sensing assembly 11 does not carry any munitions devices 57 (see FIG. 8) and does not have detonators 56 (see FIG. 8). The plurality of pulsed thrusters 40 on the surveillance and reconnaissance imaging and sensing assembly 11 may be similar to those of the target locator and interceptor imaging and sensing assembly 12. Also, the plurality of pulsed thrusters 40 on the surveillance and reconnaissance imaging and sensing assembly 11 may have a slight angular component in order to maintain the spin rate. Some flights may last several minutes and air drag may otherwise reduce spin.

Further, the advantageous features of the imaging and sensing assembly 10, such as the surveillance and reconnaissance imaging and sensing assembly 11 and the target locator and interceptor imaging and sensing assembly 12, may include having an intrinsic stability due to their gyroscopic stiffness. They may be ejected from the dispenser device 101 (see FIG. 11) with the same tip rotational speed as their translational speed. This can ensure a robust flight against tip-off moments due to wind gusts or changes in moments of inertia when the pulsed thrusters 40 activate. The imaging and sensing assembly 10 is a highly compact flying wing with resultant major structural and aerodynamic advantages over known airplane looking unmanned aerial vehicles (UAVs). The imaging and sensing assembly 10 has lift which allows it extended range. The imaging and sensing assembly 10 has divert capability, or the ability to quickly change directions. This is due to the plurality of pulsed thrusters 40 (see FIGS. 1, 6) at the periphery, such as radial thrusters 44, which may be activated in sequence to provide net impulse to the left or right. Additional central thrusters 42 and torque thrusters 46 may provide velocity either up or down. The central thrusters 42 may be located at the center, and the torque thrusters 46 may be located at the periphery in order to provide torque, thereby causing precession (change in the orientation of the rotational axis of a rotating body). If the torque thrusters 46 are used, they may be pulsed on for only a few degrees of rotation. The induced precession angle may then become angle of attack to generate lift or roll, if needed. In addition, the imaging and sensing assembly 10 may roll in order to focus on an object 94 (see FIG. 14) or a target 150 (see FIG. 17) which may be moving to one side or the other. Roll may be generated with the torque thrusters 46 which may be mounted on the rim portion 30 (see FIGS. 1, 6) of the imaging and sensing assembly 10. Roll may be the result of radial thrusters 44 at either the front or rear of the imaging and sensing assembly 10 which then induce precession in the spinning of the imaging and sensing assembly 10.

Moreover, the target locator and interceptor imaging and sensing assembly 12 may be used to intercept or disable targets 150 (see FIG. 17) before their launch. In this event the target locator and interceptor imaging and sensing assembly 12 may be launched under the direction of the crew of the flight vehicle 16 (see FIG. 17) or ground vehicle or structure and guided into and detonated above or below the target 150.

Figure 11:
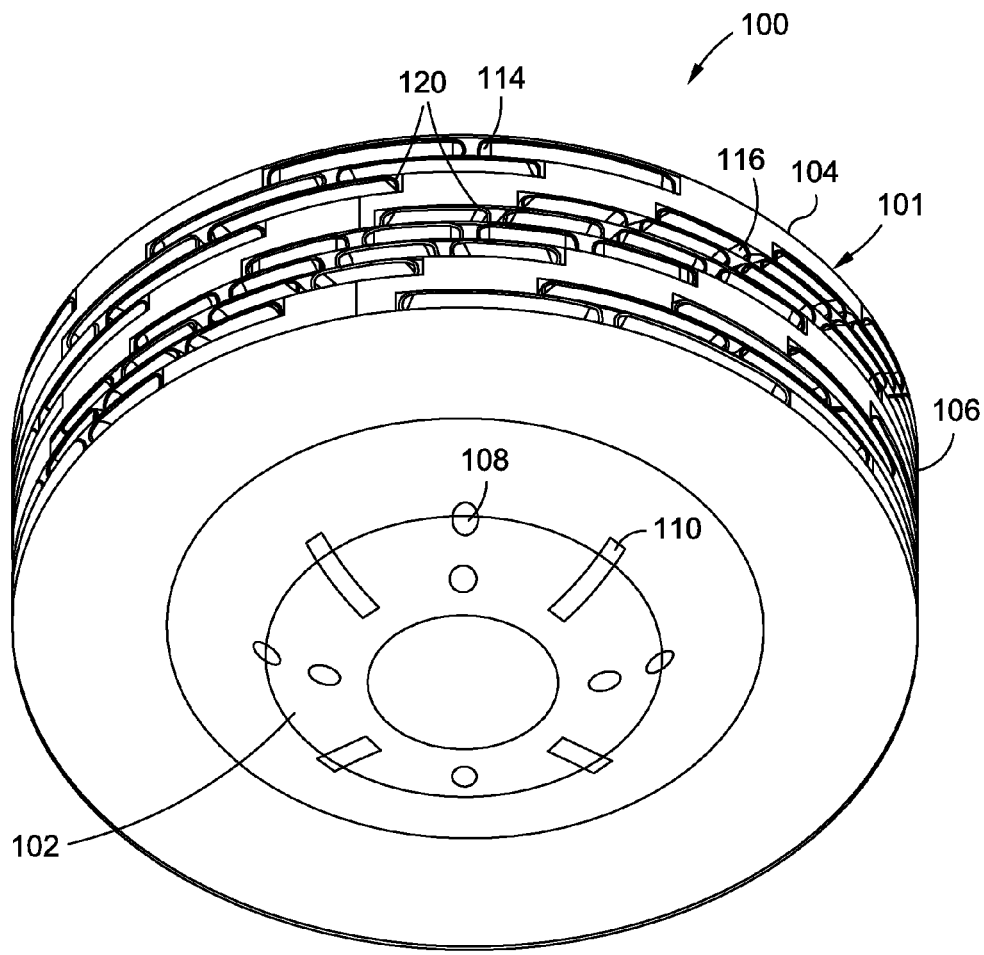
FIG. 11 is an illustration of a bottom perspective view of one of the embodiments of an imaging and sensing assembly dispenser system of the disclosure.
Figure 12:
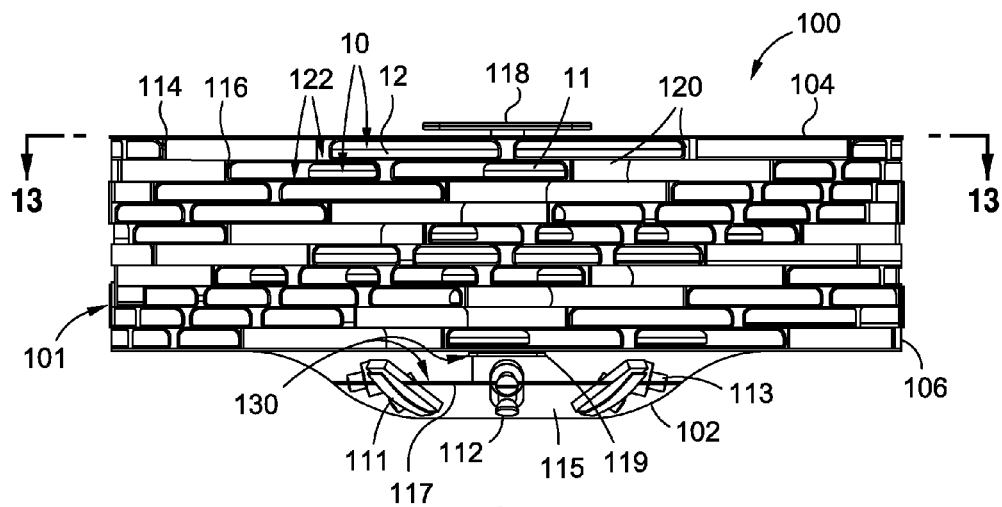
FIG. 12 is an illustration of a front cut-away view of the imaging and sensing assembly dispenser system of FIG. 11.
Figure 13:
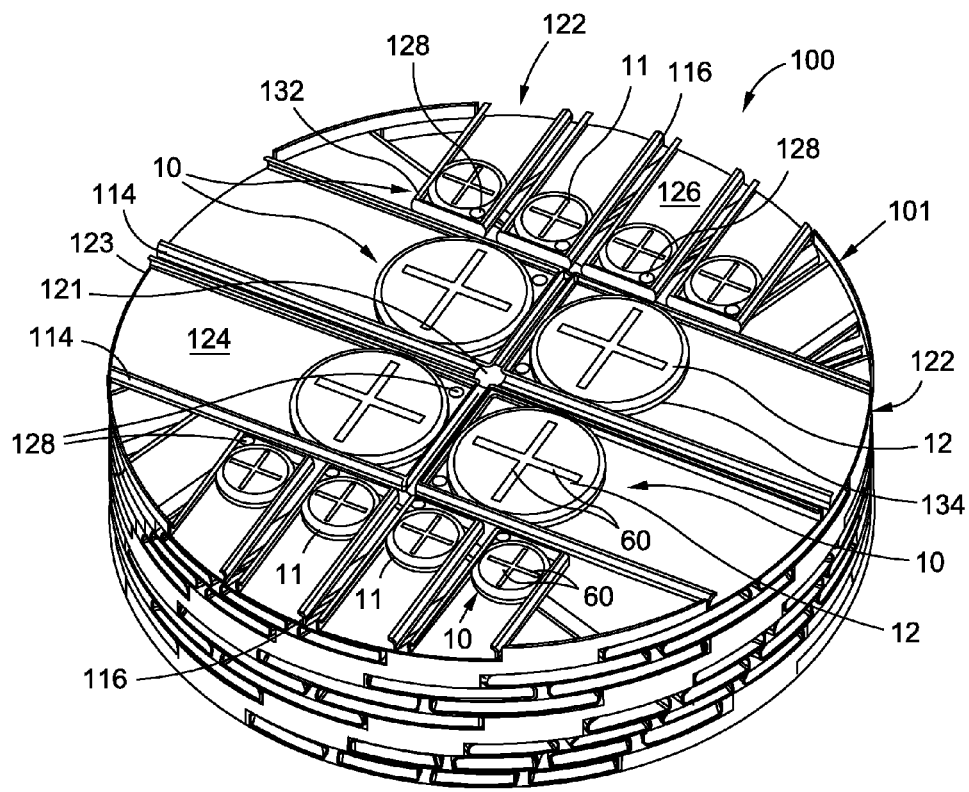
FIG. 13 is an illustration of a cross-sectional perspective view of the imaging and sensing assembly dispenser system taken along lines 13-13 of FIG. 12.

In another embodiment, there is provided a target locator and interceptor imaging and sensing assembly dispenser system 100. FIG. 11 is an illustration of a bottom perspective view of one of the embodiments of an imaging and sensing assembly dispenser system 100 of the disclosure. FIG. 12 is an illustration of a front cut-away view of the imaging and sensing assembly dispenser system 100 of FIG. 11. FIG. 13 is an illustration of a cross-sectional view of the imaging and sensing assembly dispenser system 100 taken along lines 13-13 of FIG. 12. As shown in FIG. 11, the dispenser system 100 comprises a dispenser device 101. As further shown in FIG. 11, the dispenser device 101 has a first end 102, a second end 104 and a body portion 106. As further shown in FIG. 11, the first end 102 comprises one or more radar windows 108 and one or more optical/IR (infrared) windows 110. As shown in FIG. 12, the first end 102 has an interior housing portion 115 that houses one or more optical/IR (infrared) sensor devices 111, one or more laser illuminator or designator devices 112, one or more radar sensor devices 113, and a communication system 130 comprising one or more radio frequency (RF) antenna devices 117, such as RF patch antenna device, and one or more dispenser processor devices 119. The one or more dispenser processor devices 119 may comprise a microprocessor, a computer device having one or more microprocessor central processing units (CPUs), a microcomputer, or another suitable processor device.

Preferably, the dispenser device 101 has an aerodynamic profile providing minimum or low drag. The dispenser device 101 may have a height of approximately 18 inches and a diameter of about 48 inches. However, the dispenser device 101 may be shaped or reduced in size by trading the number of first ejection barrels 124 (see FIG. 13) and second ejection barrels 126 (see FIG. 13) or dimensions of the aerodynamic members 20. A low observable dispenser device 101 may be accomplished by a combination of faceting or geometric shaping, as well as the use of radar absorbing materials (RAM).

As further shown in FIG. 12, and FIGS. 14-19, the dispenser system 100 further comprises a mounting flange 118 at the second end 104 of the dispenser device 101. The mounting flange 118 is designed for mounting the dispenser system 100 to a structure 14 (see FIGS. 14, 17), such as a flight vehicle 16 (see FIGS. 14, 17), i.e., helicopter 18 (see FIGS. 14, 17), or other flight vehicle or aircraft, or another structure.

As further shown in FIGS. 11-13, the body portion 106 of the dispenser device 101 comprises a plurality of first storage slots 114 and second storage slots 116 shaped to house one or more imaging and sensing assemblies 10. As shown in FIGS.

11-12, the first storage slots 114 are preferably larger in size and designed to house an imaging and sensing assembly 10 of a larger size. However, one embodiment of the body portion 106 may include storage slots that are of equal size. The second storage slots 116 are preferably smaller than the first storage slots 114 and are designed to house a smaller imaging and sensing assembly 10. The size of the imaging and sensing assembly 10 may be different as to the load and equipment that is carried to accomplish a stated mission. For example, a larger payload containing multiple types of sensors or to deploy to a further object location may require larger propulsive capability and therefore more fuel volumes than, for example, an imaging and sensing assembly 10 that may only have cameras or optics. The plurality of first storage slots 114 and second storage slots 116 may preferably have staggered layers 120 (see FIGS. 11-12). As shown in FIG. 13, the first storage slots 114 and the second storage slots 116 extend from a position near a central portion 121 (see FIG. 13) of the dispenser device 101 to an external surface 123 (see FIG. 13) of the dispenser device 101. The first and second storage slots 114, 116, are preferably shaped to house one or more imaging and sensing assemblies 10.

The dispenser system 100 may further include a communication system 130 (see FIG. 12) positioned on or within the dispenser device 101 in order to communicate data between the dispenser device 101 and the one or more imaging and sensing assemblies 10. The communication system 130 positioned on the one or more imaging and sensing assemblies 10 preferably comprises one or more radio frequency (RF) antenna devices 117, such as RF patch antenna devices, and one or more dispenser processor devices 119. The dispenser processor device 119 may process data or information received from the first processor device 70 receiving data obtained by the plurality of imaging and sensing devices 48 and may wirelessly transmit the data to a second processor device 74 (see FIG. 14) not positioned on the aerodynamic member 20.

The dispenser system 100 further comprises one or more ejection devices 122 (see FIGS. 12-13) to eject the one or more imaging and sensing assemblies 10 out of the dispenser device 101. The ejection devices 122 may comprise a first ejection barrel 124 (see FIG. 13) configured for disposal in the first storage slot 114 and a second ejection barrel 126 (see FIG. 13) configured for disposal in the second storage slot 116. As shown in FIG. 13, the first ejection barrels 124 may be preferably larger in size and designed to house a larger imaging and sensing assembly 10 (for example, greater than 10 inches in diameter). The first ejection barrels 124 and the second ejection barrels 126 may be inclined up and down.

The ejection devices 122 may further comprise ejection charges 128 (see FIG. 13). The ejection devices 122 may further comprise one or more rack and pinion devices 132 (see FIG. 13) or one or more belt devices 134 (see FIG. 13) for spinning the imaging and sensing assembly 10 when it is ejected. The first and second ejection barrels 124, 126 may spin the imaging and sensing assemblies 10 with one or more rack and pinion devices 132, where one side of each of the first and second ejection barrels 124,126 has modest teeth (not shown) which engage small grooves (not shown) in the imaging and sensing assemblies 10. Alternatively, the first and second ejection barrels 124, 126 may spin the imaging and sensing assemblies 10 with one or more belt devices 134 wrapped around the aerodynamic member 20 and fastened near the breech inside each of the first and second ejection barrels 124,126. Friction holds the one or more belt devices 134 to the aerodynamic member 20 during launch or ejection and then it unwraps and is left attached to the first ejection barrel 124 or the second ejection barrel 126. A third method to spin the imaging and sensing assemblies 10 may be to ignite perimeter rockets having an azimuthal thrust during launch.

The dispenser system 100 may have a modest spin rate that may be active only when needed. By virtue of the large number of first and second ejection barrels 124, 126 and their staggered layers 120 and locations, one can spin the dispenser system 100 at a mere 5 Hz (hertz) and yet have a maximum slew delay of only 10 ms (milliseconds). This spin rate may be increased in the event one requires a less than 10 ms (milliseconds) slew delay ("slew" is the rotation of an object about an axis).

The dispenser system 100 may eject the imaging and sensing assemblies 10 at velocities of 100 m/s (meters per second) or more, using the rectangular first ejection barrels 124 and second ejection barrels 126 and suitable propellant material, such as gunpowder. The use of the rectangular first ejection barrels 124 and second ejection barrels 126 may allow for accurate aiming as well as efficient and simple propulsion. For example, at a velocity of 100 m/s, less than 1% of the flight mass worth of smokeless propellant may be needed As discussed in detail above, each imaging and sensing assembly 10 stored or housed in the dispenser system 100 comprises a disc shaped aerodynamic member 20 configured to spin and self-position in flight. The imaging and sensing assembly 10 further comprises a plurality of pulsed thrusters 40 positioned on the aerodynamic member 20. The imaging and sensing assembly 10 further comprises a plurality of imaging and sensing devices 48 positioned along a perimeter portion 36 of the aerodynamic member 20. The imaging and sensing assembly 10 further comprises one or more antenna devices 60 positioned on the aerodynamic member 20 and in communication with a first processor device 70 on the aerodynamic member 20. The first processor device 70 receives data obtained by the plurality of imaging and sensing devices 48 and wirelessly transmits the data to a second processor device 74 (see FIG. 14) not positioned on the aerodynamic member 20. The imaging and sensing assembly 10 further comprises a power supply 76 for powering the imaging and sensing assembly 10.

In one advantageous embodiment, the dispenser system 100 shown in FIGS. 11-13 may include multiple first ejection barrels 124 and second ejection barrels 126 pointing in twenty (20) or more different directions, and spaced apart, such as about 18 degrees apart. This helps to insure that many or all directions may be covered. Since the first ejection barrels 124 and the second ejection barrels 126 may be independently activated or fired, the dispenser system 100 may allow a user to send multiple imaging and sensing assemblies 10 to a single object 94 (see FIG. 14) or multiple intercepts by the target locator and interceptor imaging and sensing assemblies 12 to a single target 150 (see FIG. 17).

FIG. 14 is an illustration of a front perspective view of a flight vehicle 16 incorporating one of the embodiments of the imaging and sensing assembly dispenser system 100 showing a first object position 136 by embodiments of the imaging and sensing assembly 10, such as the surveillance and reconnaissance imaging and sensing assembly 11. FIG. 14 shows exemplary imaging and sensing assemblies 10 being ejected or launched via an ejection path 142 from the dispenser system 100 toward an object 94 and then positioning itself in the first object position 136 over the object 94 in order to take an image 92 of the object 94.

Figure 15:
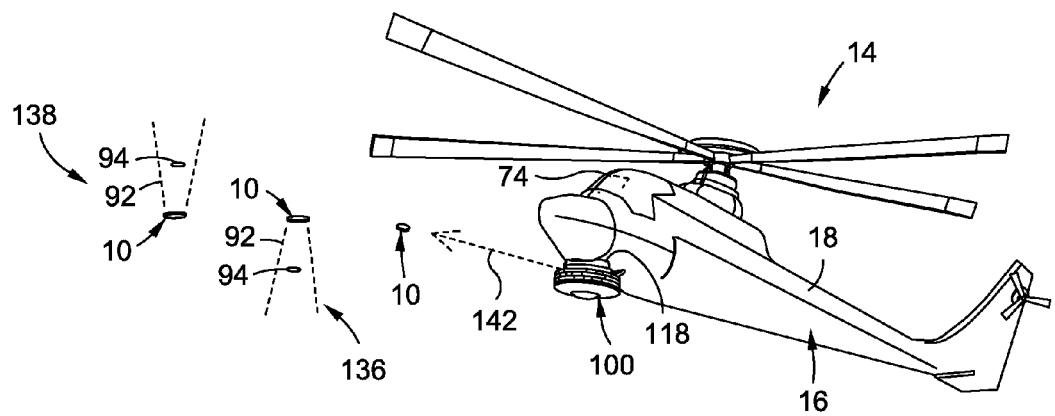
FIG. 15 is an illustration of a front perspective view of the flight vehicle with the imaging and sensing assembly dispenser system of FIG. 14 showing a first object position and a second object position by embodiments of an imaging and sensing assembly of the disclosure.

FIG. 15 is an illustration of a front perspective view of the flight vehicle 16 with the imaging and sensing assembly dispenser system 100 of FIG. 14 showing a first object position 136 and a second object position 138 by embodiments of the imaging and sensing assembly 10 of the disclosure. FIG. 15 shows exemplary imaging and sensing assemblies 10 being ejected or launched via ejection path 142 from the dispenser system 100 toward an object 94 and then positioning itself in the first object position 136 over the object 94 in order to take an image 92 of the object 94 or positioning itself in the second object position 138 under the object 94 in order to take an image 92 of the object 94.

Figure 16:
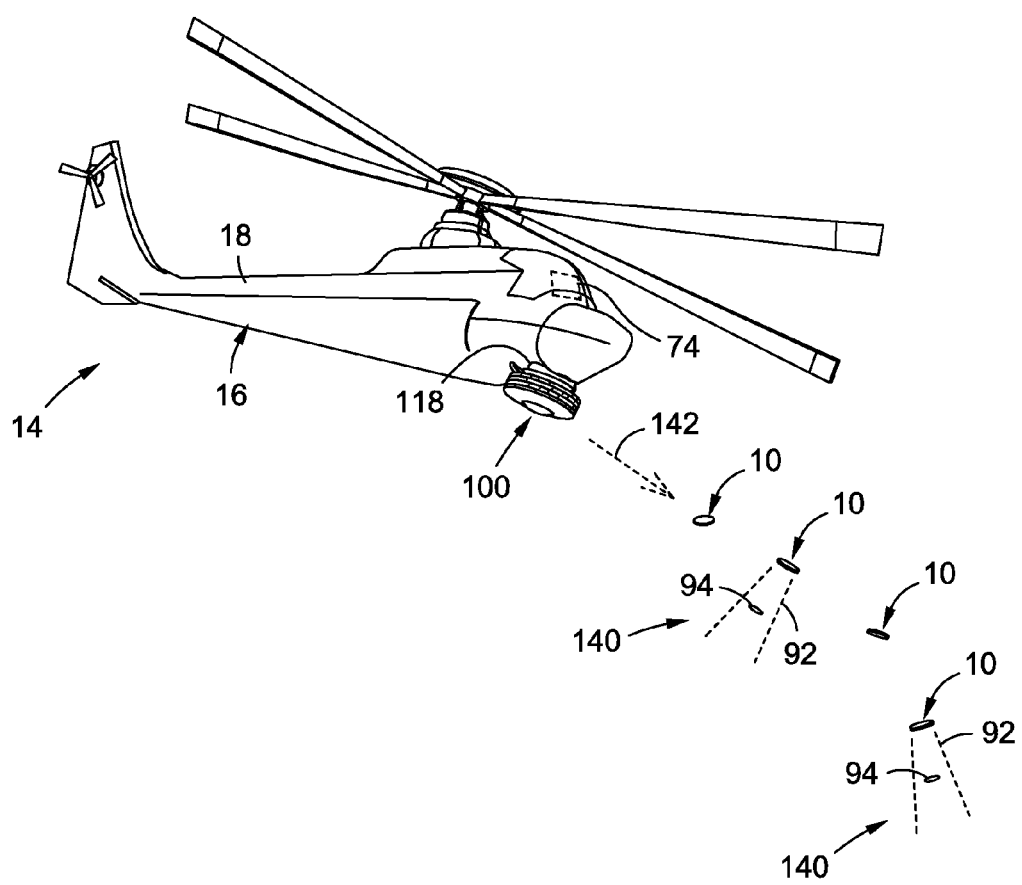
FIG. 16 is an illustration of a front perspective view of the flight vehicle with the imaging and sensing assembly dispenser system of FIG. 14 showing a third object position by embodiments of an imaging and sensing assembly of the disclosure.

FIG. 16 is an illustration of a front perspective view of the flight vehicle 16 with the imaging and sensing assembly dispenser system 100 of FIG. 14 showing a third object position 140, which is an angled or slanted position, by embodiments of the imaging and sensing assembly 10 of the disclosure. FIG. 16 shows exemplary imaging and sensing assemblies 10 being ejected or launched via ejection path 142 from the dispenser system 100 toward an object 94 and then positioning itself in the third object position 140 at an angle over the object 94 in order to take an image 92 of the object 94.

FIG. 17 is an illustration of a front perspective view of a flight vehicle 16 incorporating one of the embodiments of an imaging and sensing assembly dispenser system 100 showing a first target position 144 by embodiments of an imaging and sensing assembly 10 of the disclosure, in the form of a target locator and interceptor imaging and sensing assembly 12. Fast response time is achieved by a combination of a large number of the first ejection barrels 124 (see FIG. 13) and the second ejection barrels 126 (see FIG. 13) on a rotating dispenser device 101, combined with high velocity launch. FIG. 17 shows exemplary target locator and interceptor imaging and sensing assemblies 12 being ejected or launched via ejection path 142 from the dispenser system 100 toward a target 150. The target locator and interceptor imaging and sensing assembly 12 may position itself in the first target position 144 over the target 150 in order to intercept the target 150 by detonating a munitions device 57 (see FIG. 8) via detonators 56 (see FIG. 8) and driving a sheet of pellets 146 into the target 150 in a target zone 148, as the target 150 crosses below the target locator and interceptor imaging and sensing assembly 12.

Preferably, the target locator and interceptor imaging and sensing assembly 12 is launched at a velocity of 100 m/s (meters per second) and may intercept two targets 150 launched from different directions. The dispenser system 100 may rotate at 5 Hz (or 300 RPM) and has the first ejection barrels 124 and the second ejection barrels 126 preferably pointing every 18 degrees (360 degrees/20 barrels). This gives at most a launch delay of 0.01 seconds. This gives a total time of 0.01 second plus 10 m/100 m/s=0.11 seconds for the target locator and interceptor imaging and sensing assembly 12 to be launched and clear the flight vehicle 16 by at least 10 meters. Assuming an average target 150 (e.g., RPG) incoming speed of 200 m/s, the target locator and interceptor imaging and sensing assembly 12 should be able to intercept targets 150 launched from a distance of 200 m/s*0.11 s=22 meters or more. If a faster response time is necessary, one can increase the dispenser device 101 rotation speed and double the target locator and interceptor imaging and sensing assembly 12 launch speed to 200 m/s. This will halve the minimum target intercept distance to 11 meters.

FIG. 18 is an illustration of a front perspective view of the flight vehicle 16 with the imaging and sensing assembly dispenser system 100 of FIG. 17 showing a first target position 144 and a second target position 152 by embodiments of an imaging and sensing assembly 10 of the disclosure, in the form of a target locator and interceptor imaging and sensing assembly 12. FIG. 18 shows exemplary target locator and interceptor imaging and sensing assemblies 12 being ejected or launched via ejection path 142 from the dispenser system 100 toward a target 150. The target locator and interceptor imaging and sensing assembly 12 may position itself in the first target position 144 over the target 150 or may position itself in a second target position 152 under the target, both in order to intercept the target 150 by detonating a munitions device 57 (see FIG. 8) via detonators 56 (see FIG. 8) and driving a sheet of pellets 146 into the target 150 in a target zone 148, as the target 150 crosses below or above the target locator and interceptor imaging and sensing assembly 12.

FIG. 19 is an illustration of a front perspective view of the flight vehicle 16 with the imaging and sensing assembly dispenser system 100 of FIG. 17 showing a third target position 154, which is an angled or slanted position, by embodiments of an imaging and sensing assembly 10 of the disclosure, in the form of a target locator and interceptor imaging and sensing assembly 12. FIG. 19 shows exemplary target locator and interceptor imaging and sensing assemblies 12 being ejected or launched via ejection path 142 from the dispenser system 100 toward a target 150. The target locator and interceptor imaging and sensing assembly 12 may position itself in the third target position 154 over the target 150 in order to intercept the target 150 by detonating a munitions device 57 (see FIG. 8) via detonators (see FIG. 8) and driving a sheet of pellets 146 into the target 150 in a target zone 148, as the target 150 crosses below the target locator and interceptor imaging and sensing assembly 12.

Figure 20:
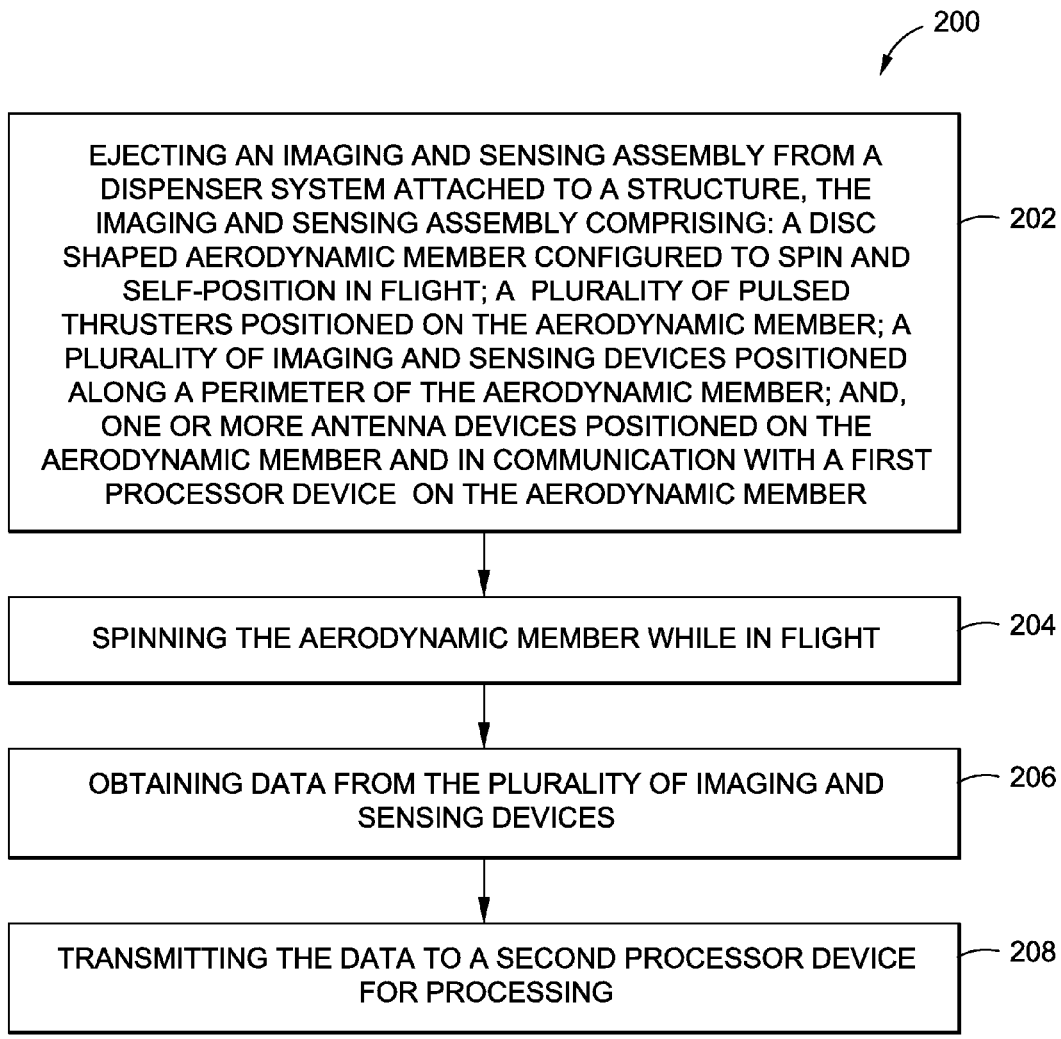
FIG. 20 is an illustration of a flow diagram showing one of the embodiments of a method of the disclosure.
Figure 22:
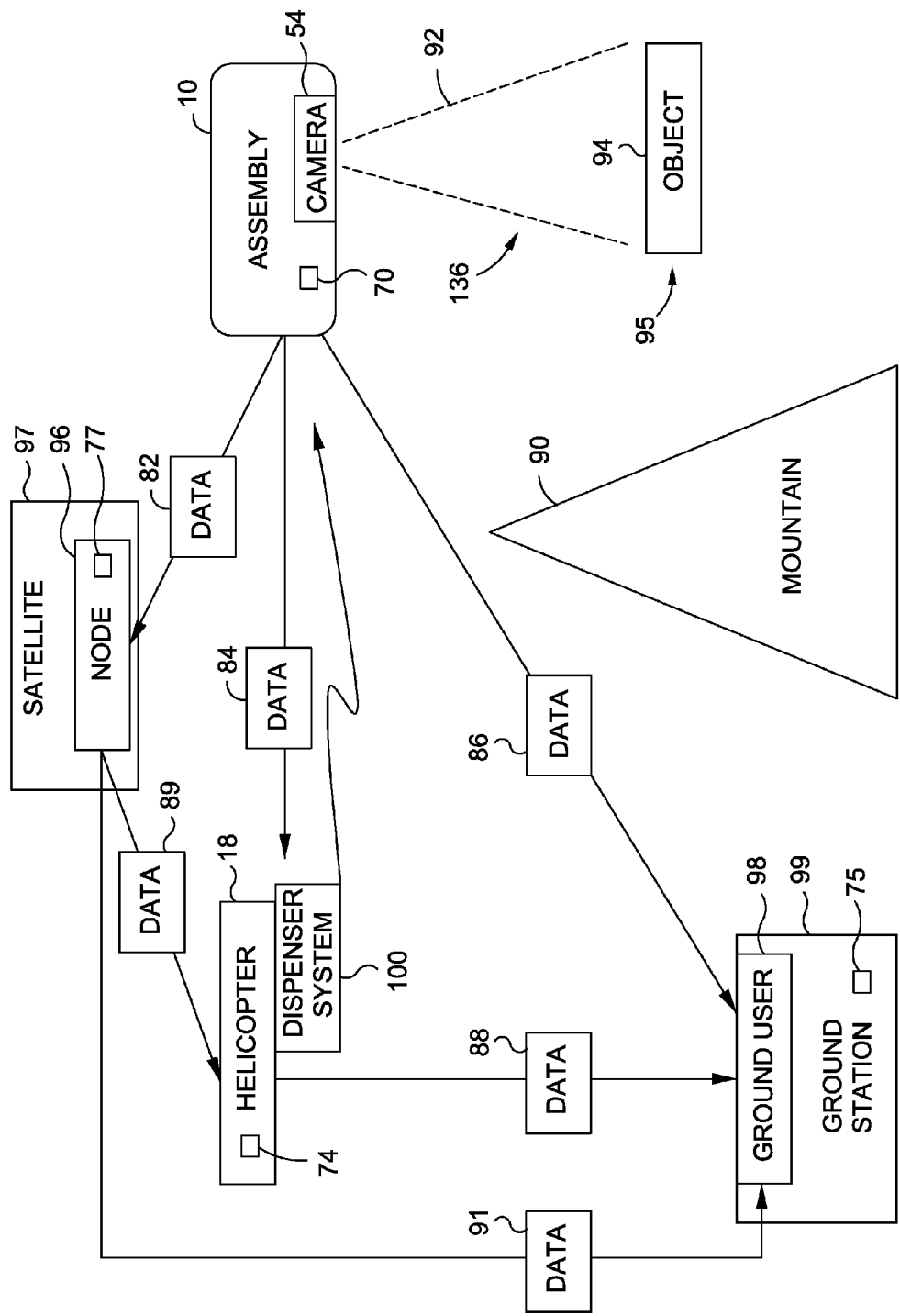
FIG. 22 is an illustration of a schematic diagram showing operation and data transmission by one of the embodiments of an imaging and sensing assembly launched from a dispenser system of the disclosure.

In another embodiment, there is provided a method 200 for imaging, sensing and obtaining data 82, 84, 86, 88, 89, 91 (see FIG. 22). FIG. 20 is an illustration of a flow diagram showing an embodiment of the method 200 of the disclosure. As shown in FIG. 20, the method 200 comprises step 202 of ejecting an imaging and sensing assembly 10 (see FIGS. 1, 6) from a dispenser system 100 (see FIG. 11) attached to a structure 14 (see FIGS. 14-16), such as from a dispenser device 101 (see FIG. 11) of the dispenser system 100. The imaging and sensing assembly 10, as discussed in detail above, comprises a disc shaped aerodynamic member 20 (see FIGS. 1, 6) configured to spin and self-position in flight. The imaging and sensing assembly 10 further comprises a plurality of pulsed thrusters 40 (see FIGS. 1, 6) positioned on the aerodynamic member 20. The imaging and sensing assembly 10 further comprises a plurality of imaging and sensing devices 48 (see FIGS. 1, 6) positioned along a perimeter portion 36 (see FIGS. 1, 6) of the rim portion 30 of the aerodynamic member 20. The imaging and sensing assembly 10 further comprises one or more antenna devices 60 (see FIGS. 2, 7) positioned on the aerodynamic member 20 and in communication with a first processor device 70 (see FIGS. 4, 8) on the aerodynamic member 20. The imaging and sensing assembly 10 further comprises a power supply 76 (see FIGS. 4, 8), as discussed above, to power the imaging and sensing assembly 10.

As further shown in FIG. 20, the method 200 further comprises step 204 of spinning the disc shaped aerodynamic member 20 while in flight. As further shown in FIG. 20, the method 200 further comprises step 206 of obtaining data 82, 84, 86 (see FIG. 22) from the plurality of imaging and sensing devices 48. The step 206 of obtaining data 82, 84, 86 (see FIG. 22) from the plurality of imaging and sensing devices 48 may further comprise obtaining a plurality of images 92 (see FIGS. 14-16) via one or more camera imaging and sensing devices 54, such as, for example, push broom optics with a linear focal plane array (see FIGS. 4, 9). The linear focal plane array may comprise a visible focal plane array and/or an infrared focal plane array. The method 200 may further comprise the step of using a global positioning system (GPS) radio frequency antenna device 64 (see FIGS. 2, 7) to guide the imaging and sensing assembly 10 to a precise location 95 (see FIG. 22) or location 151 (see FIG. 23A). In an optional example, the method 200 may include using global positioning system (GPS) radio frequency antenna devices 64 (see FIGS. 2, 7) to guide the imaging and sensing assembly 10 to a precise location 95 prior to, obtaining data 82, 84, 86 (see FIG. 22) from the plurality of imaging and sensing devices 48 (step 206).

As further shown in FIG. 20, the method 200 further comprises step 208 of, in one embodiment, transmitting the data 84 (see FIG. 22) to a second processor device 74 (see FIG. 22) for processing. The step 208 of transmitting the data 84 to the second processor device 74 may further comprise delivering high resolution streaming optical/IR (infrared) video images 92 (see FIG. 22) to a second processor device 74 (see FIG. 22). In an optional example, the method 200 may further include transmitting data which includes high resolution streaming optical/IR (infrared) video images of an object 94 (see FIG. 22) that is in a location 95 that is out of view of one or more occupants in a structure 14, such as a flight vehicle 16, for example, a helicopter 18 (see FIG. 22), and/or out of view of the structure 14, such as the flight vehicle 16, for example, the helicopter 18, such as being out of view behind a mountain 90 (see FIG. 22).

The method 200 may further comprise prior to step 202 of ejecting the imaging and sensing assembly 10 from the imaging and sensing assembly dispenser system 100, such as from the dispenser device 101 of the dispenser system 100, the step of attaching the dispenser system 100 and dispenser device 101 to a flight vehicle 16 (see FIGS. 14-16) such as a helicopter 18 (see FIGS. 14-16), and housing the second processor device 74 in the flight vehicle 16.

Figure 21:
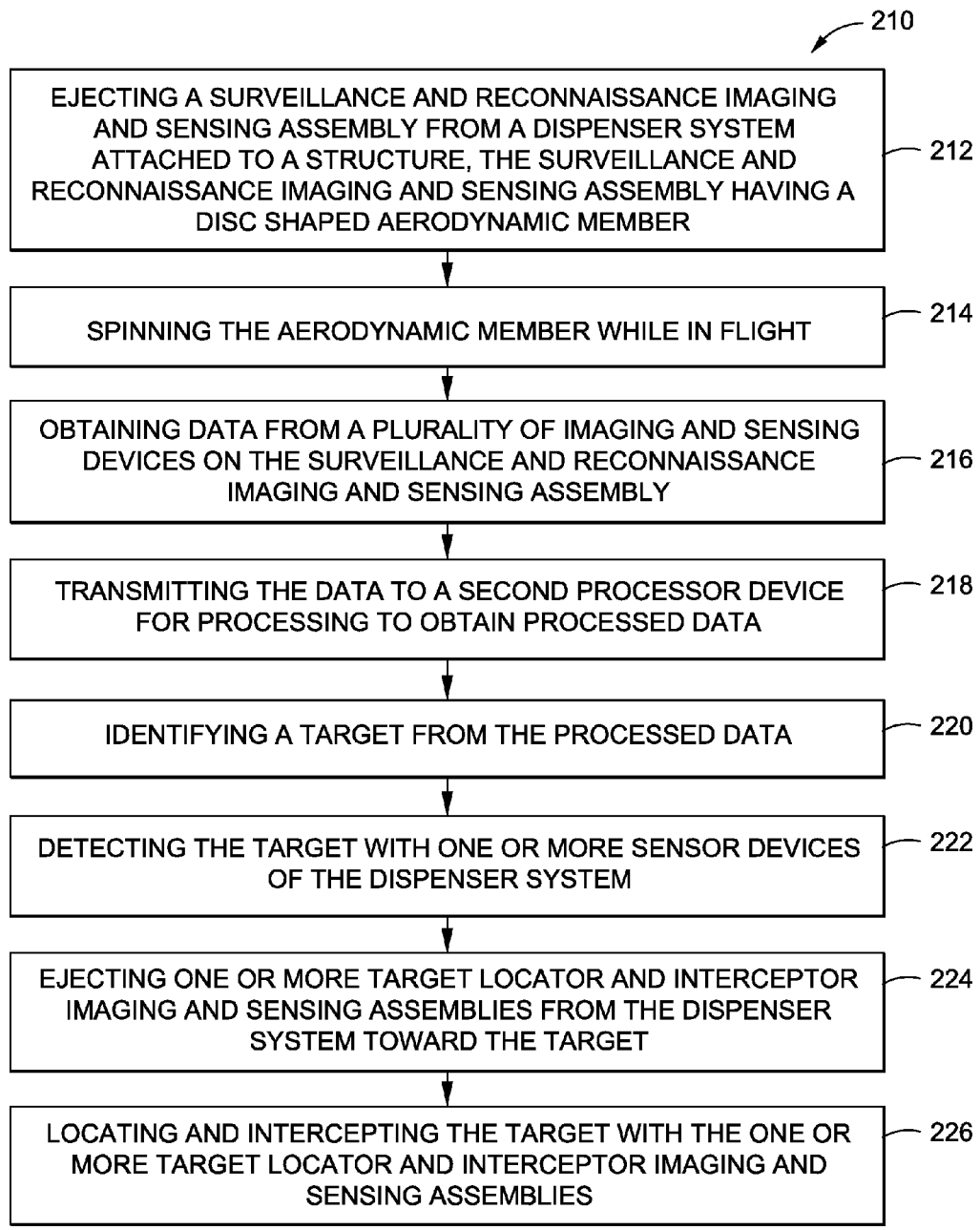
FIG. 21 is an illustration of a flow diagram showing another one of the embodiments of a method of the disclosure.
Figure 23A:
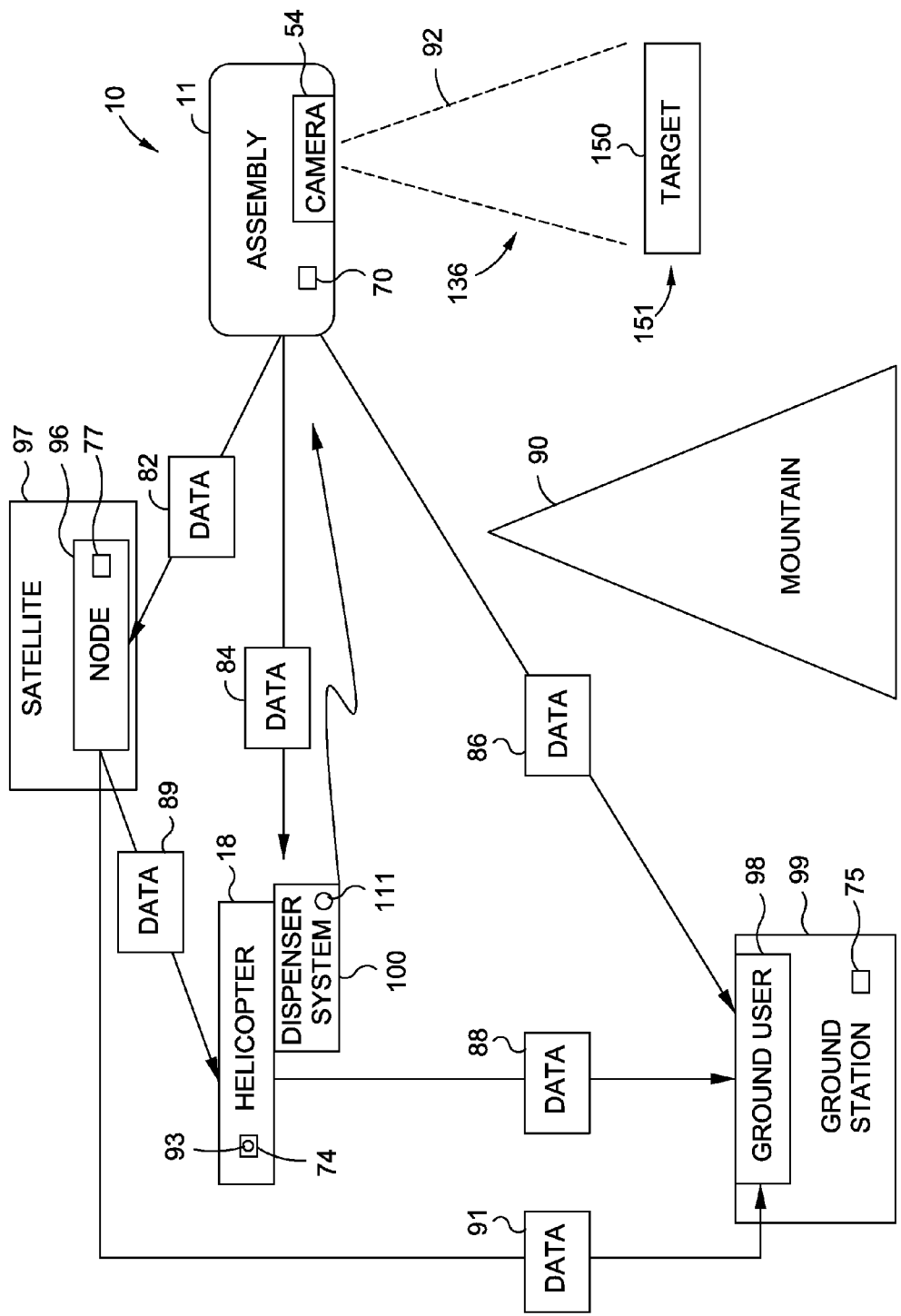

In another embodiment, there is provided a method 210 for imaging, sensing and obtaining data 82, 84, 86, 88, 89, 91 (see FIG. 23A). FIG. 21 is an illustration of a flow diagram showing an embodiment of the method 210 of the disclosure. As shown in FIG. 21, the method 210 comprises step 212 of ejecting a surveillance and reconnaissance imaging and sensing assembly 11 (see FIGS. 1, 23A) from a dispenser system 100 (see FIGS. 8, 23A) attached to a structure 14 (see FIGS. 17-19), such as from a dispenser device 101 (see FIG. 11) of the dispenser system 100. The surveillance and reconnaissance imaging and sensing assembly 11, as discussed in detail above, comprises a disc shaped aerodynamic member 20 (see FIG. 1) configured to spin and self-position in flight. The surveillance and reconnaissance imaging and sensing assembly 11 further comprises a plurality of pulsed thrusters 40 (see FIG. 1) positioned on the aerodynamic member 20. The surveillance and reconnaissance imaging and sensing assembly 11 further comprises a plurality of imaging and sensing devices 48 (see FIG. 1) positioned along a perimeter portion 36 (see FIG. 1) of the rim portion 30 of the aerodynamic member 20. The surveillance and reconnaissance imaging and sensing assembly 11 further comprises one or more antenna devices 60 (see FIG. 2) positioned on the aerodynamic member 20 and in communication with a first processor device 70 (see FIG. 4) on the aerodynamic member 20. The surveillance and reconnaissance imaging and sensing assembly 11 further comprises a power supply 76 (see FIG. 4), as discussed above, to power the surveillance and reconnaissance imaging and sensing assembly 11.

As further shown in FIG. 21, the method 210 further comprises step 214 of spinning the disc shaped aerodynamic member 20 while in flight. As further shown in FIG. 21, the method 210 further comprises step 216 of obtaining data 82, 84, 86 (see FIG. 23A) from the plurality of imaging and sensing devices 48. The step 216 of obtaining data 82, 84, 86 (see FIG. 23A) from the plurality of imaging and sensing devices 48 may further comprise obtaining a plurality of images 92 (see FIGS. 14-16, 23A) via one or more camera imaging and sensing devices 54 (see FIG. 23A), such as, for example, push broom optics with a linear focal plane array (see FIG. 4). The linear focal plane array may comprise a visible focal plane array and/or an infrared focal plane array. The method 210 may further comprise the step of using a global positioning system (GPS) radio frequency antenna device 64 (see FIG. 2) to guide the surveillance and reconnaissance imaging and sensing assembly 11 to a precise location 151 (see FIG. 23A). In an optional example, the method 210 may include using global positioning system (GPS) radio frequency antenna devices 64 (see FIG. 2) to guide the surveillance and reconnaissance imaging and sensing assembly 11 to a precise location 151 (see FIG. 23A) prior to obtaining data 82, 84, 86 (see FIG. 23A) from the plurality of imaging and sensing devices 48 (step 216).

As further shown in FIG. 21, the method 210 further comprises step 218 of, in one embodiment, transmitting the data 84 (see FIG. 23A) to a second processor device 74 (see FIG. 23A) for processing to obtain processed data 93 (see FIG. 23A). The step 218 of transmitting the data 84 to the second processor device 74 may further comprise delivering high resolution streaming optical/IR (infrared) video images 92 (see FIG. 23A) to a second processor device 74 (see FIG. 23A). In an optional example, the method 210 may further include transmitting data which includes high resolution streaming optical/IR (infrared) video images of a target 150 (see FIG. 23A) that is in a location 151 (see FIG. 23A) that is out of view of one or more occupants in a structure 14, such as a flight vehicle 16, for example, a helicopter 18 (see FIG. 23A), and/or out of view of the structure 14, such as the flight vehicle 16, for example, the helicopter 18, such as being out of view behind a mountain 90 (see FIG. 23A).

The method 210 may further comprise prior to step 212 of ejecting the surveillance and reconnaissance imaging and sensing assembly 11 from the dispenser system 100, such as from the dispenser device 101 of the dispenser system 100, the step of attaching the dispenser system 100 and dispenser device 101 to a flight vehicle 16 (see FIGS. 14-16), such as a helicopter 18 (see FIGS. 14-16, 23A), and housing the second processor device 74 in the flight vehicle 16.

As further shown in FIG. 21, the method 210 further comprises step 220 of identifying a target 150 (see FIG. 23A) from the processed data 93 (see FIG. 23A). As further shown in FIG. 21, the method 210 further comprises step 222 of detecting the target 150 with one or more sensor devices 111 (see FIG. 23B) of the dispenser system 100, for example, the one or more sensor devices 111 may be positioned on or in the dispenser device 101 of the dispenser system 100 (see FIG. 23B). As further shown in FIG. 21, the method 210 further comprises step 224 of ejecting one or more target locator and interceptor imaging and sensing assemblies 12 (see FIGS. 6, 23B) from the dispenser system 100, such as from the dispenser device 101 of the dispenser system 100, and toward the target 150. As further shown in FIG. 21, the method 210 further comprises step 226 of locating and intercepting the target 150 with the one or more target locator and interceptor imaging and sensing assemblies 12.

Figure 26:
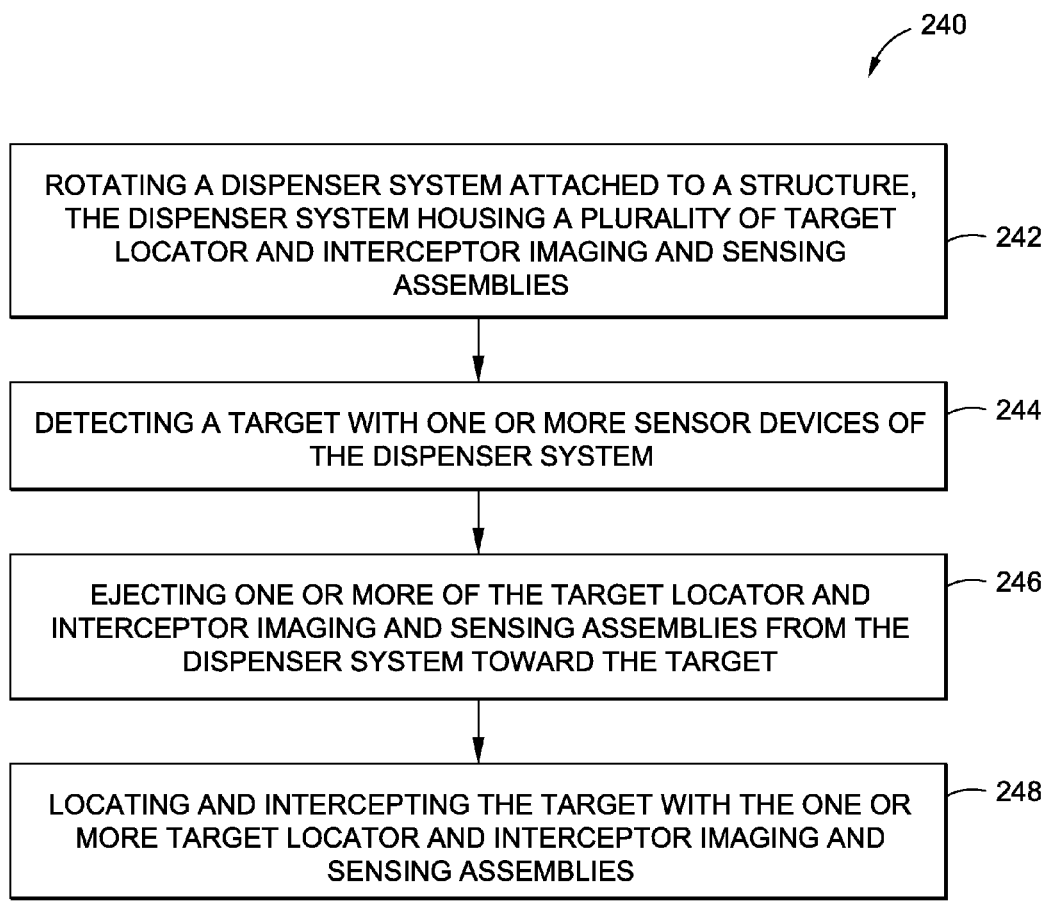

FIG. 26 is an illustration of a flow diagram showing another one of the embodiments of a method 240 of the disclosure. As an alternative to using the one or more surveillance and reconnaissance imaging and sensing assemblies 11 to detect the target 150 and/or location 151 prior to ejecting or launching the target locator and interceptor imaging and sensing assemblies 12, a method 240 may comprise using the sensor devices 111 (see FIGS. 12, 23B) of the dispenser system 100 to detect the target 150 and/or location 151 prior to ejecting or launching the target locator and interceptor imaging and sensing assemblies 12. As shown in FIG. 26, the method 240 comprises step 242 of rotating the dispenser system 100 (see FIG. 23B) attached to a structure 14 (see FIG. 17), the dispenser system 100 housing with a dispenser device 101 (see FIG. 12) a plurality of target locator and interceptor imaging and sensing devices 12. As further shown in FIG. 26, the method 240 further comprises step 244 of detecting a target 150 (see FIG. 23B) with one or more sensors 111 (see FIG. 23B), as discussed above, of the dispenser system 100. As further shown in FIG. 26, the method 240 further comprises step 246 of ejecting one or more target locator and interceptor imaging and sensing assemblies 12 (see FIG. 23B) from the dispenser system 100 (see FIG. 23B) toward the target 150 (see FIG. 23B). The method 240 may further comprise using the dispenser system 100 to cause the one or more target locator and interceptor imaging and sensing assemblies 12 to move toward the target 150 (see FIG. 23B), or alternatively, the one or more target locator and interceptor imaging and sensing assemblies 12 may autonomously move toward the target 150. As further shown in FIG. 26, the method 240 further comprises step 248 of locating and intercepting the target 150 with the one or more target locator and interceptor imaging and sensing assemblies 12. Such location and interception by the one or more target locator and interceptor imaging and sensing assemblies 12 is discussed in detail below with respect to FIG. 23B.

FIG. 22 is an illustration of a schematic diagram showing operation and data transmission by one of the embodiments of an imaging and sensing assembly 10 ejected or launched from a dispenser system 100. In operation, the dispenser system 100 may be mounted onto a structure 14 (see FIGS. 14, 17). The structure 14 may comprise a flight vehicle 16 (see FIGS. 14, 17), such as a helicopter 18 (see FIGS. 14, 17) or aircraft. The structure 14 may further comprise a vessel, a ground vehicle, a stationary structure, or another suitable structure. The dispenser system 100 may have a mounting flange 118 (see FIG. 14) for attachment to the structure 14, such as the helicopter 18. The imaging and sensing assemblies 10 may be loaded or may have already been loaded into the dispenser system 100 when the dispenser system 100 is mounted to the structure 14, such as the helicopter 18. An electric motor (not shown) in the dispenser system 100 may be activated and cause the body portion 106 (see FIG. 11) of the dispenser device 101 (see FIG. 11) to rotate/spin with respect to the mounting flange 118.

As an object 94 (see FIG. 22) or a location 95 (see FIG. 22) is approached, the dispenser system 100 (see FIG. 22) may be turned on. Turning on the dispenser system 100 may include activating or providing power to the various sensor devices within one of the imaging and sensing assemblies 10 (e.g., imaging and sensing devices 48 (see FIG. 1)) and/or within the dispenser system 100 (e.g., sensor devices 111 (see FIG. 12)). Turning on the dispenser system 100 may also include rotating the dispenser system 100 and the dispenser device 101 (see FIG. 11) of the dispenser system 100. The imaging and sensing assembly 10 and/or the dispenser system 100 may use the sensor devices to determine a location 95 or detect an object 94, including locations 95 or objects 94 out of view of the helicopter 18, such as behind a mountain 90 (see FIG. 22) or other type of terrain.

At a predetermined range from the object 94, multiple imaging and sensing assemblies 10 may be ejected or launched toward the object 94 and/or location 95. The imaging and sensing assemblies 10 may be autonomously directed to the object 94 and/or location 95 or it may be controlled by a human user using visual monitors that are configured to show images 92 (see FIG. 22) retrieved by the imaging and sensing assembly 10 and joy sticks that may be configured to control the plurality of pulsed thrusters 40 on the imaging and sensing assembly 10. As the video from the imaging and sensing assembly 10 is observed, new locations and objects may be identified.

As shown in FIG. 22, the imaging and sensing assembly 10 may be ejected or launched toward an object 94 at a location 95 from the dispenser system 100 attached to the helicopter 18. The imaging and sensing assembly 10 images and senses the object 94 with one or more of the plurality of imaging and sensing devices 48 (see FIGS. 1, 6), such as a camera imaging and sensing device 54, for example, in the form of push broom optics with a linear focal plane array. As shown in FIG. 22, the imaging and sensing assembly 10 uses the camera imaging and sensing device 54 to take an image 92 of the object 94 and/or location 95 and uses a first processor device 70, such as a computer or microprocessor, located on the imaging and sensing assembly 10 to process the image 92 of the object 94 and/or location 95. The imaging and sensing assembly 10 may then communicate or transmit data 84 about the image 92 or location 95 back to the helicopter 18 for processing by a second processor device 74, such as a computer, housed in the helicopter 18. As shown in FIG. 22, the imaging and sensing assembly 10 may further communicate or transmit data 86 to a ground user 98 at a ground station 99 for processing by a third processor device 75, such as a computer or microprocessor device. As further shown in FIG. 22, the imaging and sensing assembly 10 may further communicate or transmit data 82 to a processor communication transmission node 96 in a satellite 97, for example, for processing by a fourth processor device 77, such as a computer or microprocessor. As further shown in FIG. 22, the processor communication transmission node 96 (see FIG. 22) may relay data 89 to the helicopter 18 having the second processor device 74 for processing the data 89, and/or may relay data 91 to the ground station 99 or ground location having a third processor device 75 for processing the data. As further shown in FIG. 22, the helicopter 18 may also transmit data 88 received and processed by the second processor device 74 to the ground user 98 at the ground station 99.

FIGS. 23A-23B are illustrations of schematic diagrams showing operation and data transmission by embodiments of the imaging and sensing assembly 10 launched from a dispenser system 100 of the disclosure. FIG. 23A shows operation and data transmission by the imaging and sensing assembly 10, such as surveillance and reconnaissance imaging and sensing assembly 11, launched from the dispenser system 100. FIG. 23B shows operation and data transmission by the imaging and sensing assembly 10, such as target locator and interceptor imaging and sensing assembly 12, launched from the dispenser system 100.

In operation, the dispenser system 100 may be mounted onto a structure 14 (see FIGS. 14, 17). The structure 14 may comprise a flight vehicle 16 (see FIGS. 14, 17), such as a helicopter 18 (see FIGS. 23A-23B) or aircraft. The structure 14 may further comprise a vessel, a ground vehicle, a stationary structure, or another suitable structure. The dispenser system 100 may have a mounting flange 118 (see FIG. 14) for attachment to the structure 14, such as the helicopter 18. The imaging and sensing assemblies 10 may be loaded or may have already been loaded into the dispenser system 100 when the dispenser system 100 is mounted to the structure 14, such as the helicopter 18. An electric motor (not shown) in the dispenser system 100 may be activated and cause the body portion 106 (see FIG. 11) of the dispenser device 101 (see FIG. 11) to rotate/spin with respect to the mounting flange 118.

As a target 150 (see FIG. 23A) or a location 151 (see FIG. 23A) is approached, the dispenser system 100 (see FIG. 23A) may be turned on. Turning on the dispenser system 100 may include activating or providing power to the various sensor devices within one of the imaging and sensing assemblies 10 (e.g., imaging and sensing devices 48 (see FIG. 1)) and/or within the dispenser system 100 (e.g., sensor devices 111 (see FIG. 23A)). Turning on the dispenser system 100 may also include rotating the dispenser system 100 and the dispenser device 101 (see FIG. 11) of the dispenser system 100. The imaging and sensing assembly 10 and/or the dispenser system 100 may use the sensor devices to detect a target 150 (see FIG. 23A) or to determine a location 151 (see FIG. 23A) of the target 150, including targets 150 and locations 151 out of view of the helicopter 18, such as behind a mountain 90 (see FIG. 23A) or other type of terrain.

At a predetermined range from the target 150, multiple imaging and sensing assemblies 10, such as surveillance and reconnaissance imaging and sensing assemblies 11, may be ejected or launched toward the target 150 and/or location 151. The imaging and sensing assemblies 10 may be autonomously directed to the target 150 and/or location 151 or it may be controlled by a human user using visual monitors that are configured to show images 92 (see FIG. 23A) retrieved by the imaging and sensing assembly 10 and joy sticks that may be configured to control the plurality of pulsed thrusters 40 (see FIG. 1) on the imaging and sensing assembly 10. As the video from the imaging and sensing assembly 10 is observed, new locations and objects may be identified.

As shown in FIG. 23A, the imaging and sensing assembly 10, such as the surveillance and reconnaissance imaging and sensing assembly 11, may be ejected or launched toward a target 150 at a location 151 from the dispenser system 100 attached to the helicopter 18. The imaging and sensing assembly 10 images and senses the target 150 with one or more of the plurality of imaging and sensing devices 48 (see FIG. 1), such as a camera imaging and sensing device 54 (see FIG. 23A), for example, in the form of push broom optics with a linear focal plane array. As shown in FIG. 23A, the imaging and sensing assembly 10 uses the camera imaging and sensing device 54 to take an image 92 of the target 150 and/or location 151 and uses a first processor device 70, such as a computer or microprocessor, located on the imaging and sensing assembly 10 to process the image 92 of the target 150 and/or location 151. The imaging and sensing assembly 10 may then communicate or transmit data 84 about the image 92 or location 151 back to the helicopter 18 for processing by a second processor device 74, such as a computer, housed in the helicopter 18. The second processor device 74 processes the data 84 in order to obtain processed data 93 (see FIGS. 23A-23B) which may be used to identify the target 150. As shown in FIG. 23A, the imaging and sensing assembly 10 may further communicate or transmit data 86 to a ground user 98 at a ground station 99 for processing by a third processor device 75, such as a computer or microprocessor device. As further shown in FIG. 23A, the imaging and sensing assembly 10 may further communicate or transmit data 82 to a processor communication transmission node 96 in a satellite 97, for example, for processing by a fourth processor device 77, such as a computer or microprocessor. As further shown in FIG. 23A, the processor communication transmission node 96 (see FIG. 22A) may relay data 89 to the helicopter 18 having the second processor device 74 for processing the data 89, and/or may relay data 91 to the ground station 99 or ground location having a third processor device 75 for processing the data. As further shown in FIG. 23A, the helicopter 18 may also transmit data 88 received and processed by the second processor device 74 to the ground user 98 at the ground station 99.

As the high resolution streaming video is observed, targets 150 and locations 151 may be identified, such as with the processed data 93 (see FIGS. 23A-23B). A second series of surveillance and reconnaissance imaging and sensing assemblies 11 may then be launched to more closely examine the targets 150 and/or locations 151. In the event a target 150 or threat is clearly identified, one or more target locator and interceptor imaging and sensing assemblies 12 may be activated to intercept the target 150 from a safe distance.

FIG. 23B shows operation and data transmission by the imaging and sensing assembly 10, in the form of target locator and interceptor imaging and sensing assembly 12, launched from the dispenser system 100, once the target 150 and/or location 151 has been clearly identified. The flight vehicle 16, such as helicopter 18 (see FIG. 23B) may proceed into the location 151 of the target 150 with the sensor devices 111 (see FIG. 23B) on the dispenser system 100 (see FIG. 23B) on high alert. In the event a target 150 or threat approaches or is fired at the helicopter 18, the sensor devices 111 using radar and flash detection direct the dispenser system 100 to release one or more target locator and interceptor imaging and sensing assemblies 12 at each incoming target 150 or threat. The dispenser device 101 of the dispenser system 100 may house 20 or more target locator and interceptor imaging and sensing assemblies 12. The target locator and interceptor imaging and sensing assemblies 12 may be directed by the sensor devices 111 toward the target 150 or threat and may be given sufficient divert velocity plus roll to engage the target 150 or threat. A radio frequency proximity fuse antenna 62 (see FIG. 7) on the target locator and interceptor and sensing assembly 12 may detect the target 150 or threat and determine the proper firing time and detonation.

The target locator and interceptor imaging and sensing assembly 12 may be initially aimed over (or under) an incoming flight path of a target 150, such as a rocket propelled grenade (RPG). As shown in FIG. 23B, the target locator and interceptor imaging and sensing assembly 12 may position itself in the first target position 144 over the target 150 in order to intercept the target 150 by detonating a munitions device 57 via detonators (see FIG. 8) and driving a sheet of pellets 146 into the target 150 in a target zone 148, as the target 150 crosses below the target locator and interceptor imaging and sensing assembly 12. The detonation may drive a sheet of pellets 146 (see FIG. 23B) into the target 150 or threat as it crosses below (or above) the one or more target locator and interceptor imaging and sensing assemblies 12. The pellets 146, which may be comprised of dense metal powder/spheres material, and are preferably configured to intercept and/or disable the target 150 or threat. The munitions device 57 may comprise an explosive disk with a layer of high density (tungsten or other) metal pellets 146 near its free surface.

The target locator and interceptor imaging and sensing assembly 12 preferably focuses the pellets 146 into a small, user defined target zone 148 or pattern. The target zone 148 or pattern of the shot or detonation is preferably conical in shape with a modest (5 degrees to 20 degrees) half angle to focus the shot or detonation in the target zone 148. The target locator and interceptor imaging and sensing assembly 12 may use the Misznay-Schardin effect to drive a sheet of fine metal pellets 146 downward (or upward) perpendicular to the trajectory. One or more detonators 56 (see FIG. 8) distributed on the back of the target locator and interceptor imaging and sensing assembly 12 and coupled to one or more munitions devices 57

(see FIG. 8) may be given different timing delays in order to tailor the target zone 148 or pattern. A smaller target zone 148 may allow for a high density of the pellets 146 on the target 150 which may result in a more intense pellet pattern. A larger target zone 148 may allow a broader but less intense pellet pattern. The pellets 146 from the target locator and interceptor imaging and sensing assembly 12 blast may drop in speed or velocity exponentially in distance from the blast location due to their small size. After flying about 20 meters the pellets 146 may be at a speed of 50 meters/second or less. The size and density of the metal pellets 146 may be tailored to the preferred depth of the target zone 148. For example if it is desired to have a target zone 148 of no more than 10 meters vertically, a shot size may be selected such that the pellets 146 may be slowed down to negligible speeds after 10 meters.

After the targets 150 or threats have been intercepted, the sensor devices 111 on the dispenser system 100 may direct additional target locator and interceptor imaging and sensing assemblies 12 to fly out and disable the target launchers (not shown). Additional surveillance and reconnaissance imaging and sensing assemblies 11 may be released to obtain further data or information about the target 150 and/or location 151 or to dispense supplies to the ground.

The flight vehicle 16, such as the helicopter 18, may then depart the area and may be sent to launch long term surveillance and reconnaissance imaging and sensing assemblies 11 in another region of interest. These surveillance and reconnaissance imaging and sensing assemblies 11 may use GPS and/or laser designated or joystick directed homing. They may land in the area of interest and become remote monitors using solar cells 80 (see FIG. 2) and batteries 78 (see FIG. 4) to provide power. Their sensor package has preferably been tailored to the application and they may relay information to the second processor device 74 at regular intervals. After the flight vehicle crew concludes there is no more need, the dispenser system 100 is turned off for the flight back.

The short reaction time and multiple threat scenarios require the ability to launch multiple target locator and interceptor imaging and sensing assemblies 12 with near simultaneity and in different directions. By rotating the dispenser system 100 and the dispenser device 101, one or more target locator and interceptor imaging and sensing assemblies 12 may be selected and launched or ejected accurately and with a very short reaction time. The dispenser system 100 has multiple sensor devices 111, such as optical/IR sensor devices, and radar devices 113 (see FIG. 12) that can detect target 150 launch and that may predict the target 150 trajectory. Upon detection of a target 150, the dispenser system 100 may launch or eject the target locator and interceptor imaging and sensing assembly 12 toward the target 150 and guide the target locator and interceptor imaging and sensing assembly 12 into the correct location and detonate the munitions device 57 (see FIG. 23B) via detonators 56 (see FIG. 8) in the target locator and interceptor imaging and sensing assembly 12. An alternate version allows the target locator and interceptor imaging and sensing assembly 12 to autonomously guide itself towards the target 150 after launch and to determine the proper detonation time based on information supplied from a radio frequency proximity fuse antenna device 62 or from the dispenser system 100.

Figure 24:
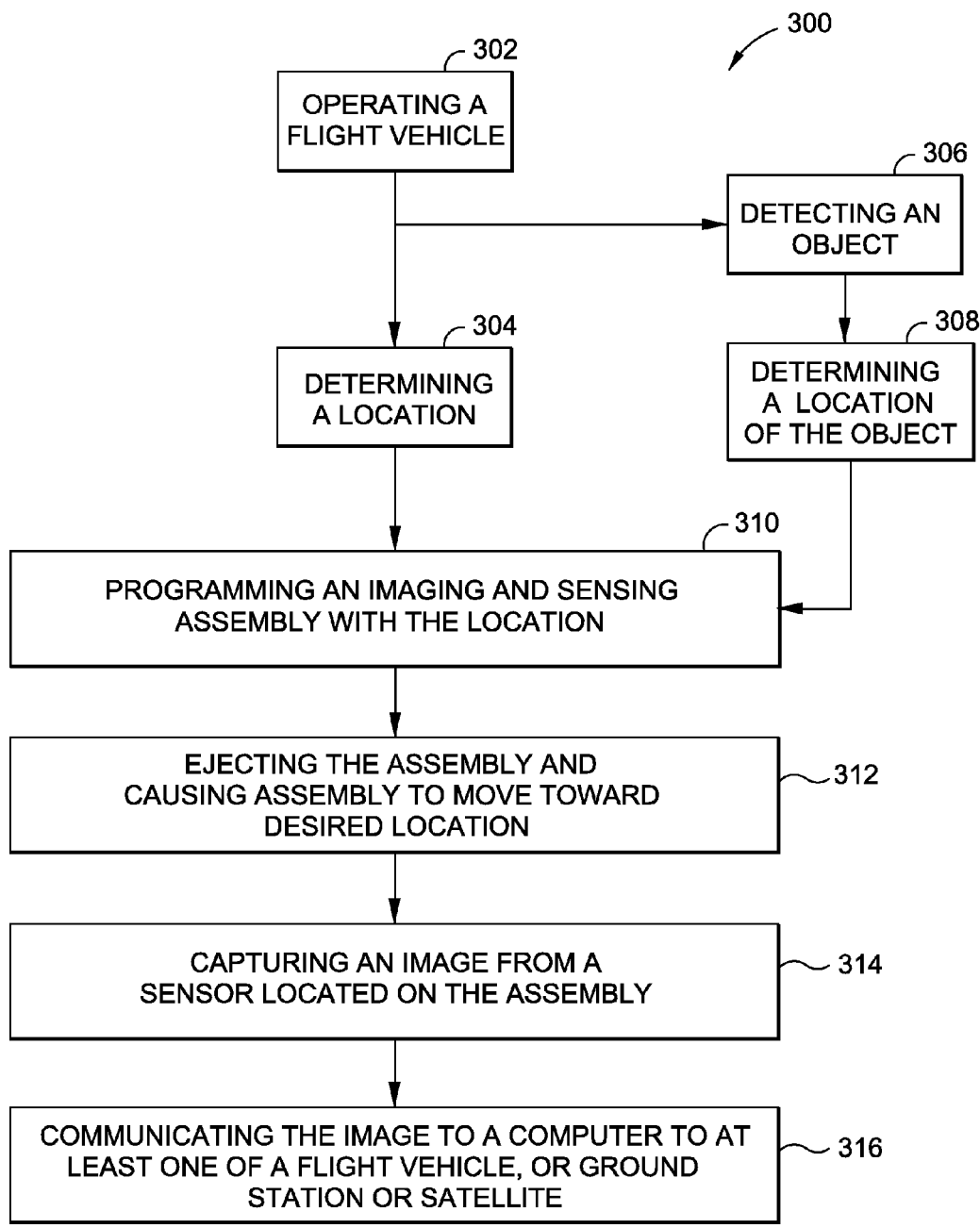
FIG. 24 is an illustration of a schematic diagram showing another embodiment of a method of the disclosure.

FIG. 24 is an illustration of a schematic diagram showing another embodiment of a method 300 for operation and control of an imaging and sensing assembly 10. The method 300 comprises step 302 of operating a flight vehicle 16 (see FIGS. 14, 17), such as a helicopter 18 (see FIGS. 14, 17), an aircraft, or another flight vehicle 16, where the flight vehicle 16 has a dispenser system 100 (see FIGS. 11, 14) mounted to the flight vehicle 16. The dispenser system 100 is preferably loaded with a plurality of imaging and sensing assemblies 10 (see FIGS. 1-7), as discussed in detail above. The dispenser system 100 comprises a dispenser device 101 (see FIG. 12) having an interior housing portion 115 (see FIG. 12) that houses one or more sensor devices 111 (see FIG. 12), such as optical/IR (infrared) sensor devices, one or more laser illuminator or designator devices 112 (see FIG. 12), one or more radar sensor devices 113 (see FIG. 12), and a communication system 130 (see FIG. 12) comprising one or more radio frequency (RF) antenna devices 117 (see FIG. 12), such as RF patch antenna device, and one or more dispenser processor devices 119 (see FIG. 12).

As shown in FIG. 24, the method 300 further comprises step 304 of determining a location for surveillance or reconnaissance using the one or more sensor devices 111 (see FIG. 12), such as optical/IR (infrared) sensor devices, the one or more laser illuminator or designator devices 112 (see FIG. 12), and/or the one or more radar sensor devices 113 (see FIG. 12) on the dispenser system 100. As further shown in FIG. 24, alternatively, the method 300 further comprises step 306 of detecting an object (see FIG. 22) using the one or more sensor devices 111 (see FIG. 12), such as optical/IR (infrared) sensor devices, the one or more laser illuminator or designator devices 112 (see FIG. 12), and/or the one or more radar sensor devices 113 (see FIG. 12), and further comprises step 308 of determining a location 95 (see FIG. 22) of the object 94 (see FIG. 22) using the one or more sensor devices 111 (see FIG. 12), such as optical/IR (infrared) sensor devices, the one or more laser illuminator or designator devices 112 (see FIG. 12), and/or the one or more radar sensor devices 113 (see FIG. 12).

As further shown in FIG. 24, the method 300 further comprises after step 304 of determining a location or after steps 306 of detecting the object 94 and determining the location 95, the step 310 of programming an imaging and sensing assembly 10 with the location 95, such as the location 95 of the object 94, using the communication system 130 (see FIG. 12), the one or more radio frequency (RF) antenna devices 117, such as RF patch antenna devices, and one or more dispenser processor devices 119 (see FIG. 12). The communication system 130 communicates the location 95 of the object 95 to the imaging and sensing assembly 10.

As further shown in FIG. 24, the method 300 further comprises step 312 of ejecting one or more imaging and sensing assemblies 10 via the first and second ejection barrels 124, 126 (see FIG. 13) from the dispenser device 101 of the dispenser system 100 and causing the imaging and sensing assembly 10 to move toward the desired location 95 or object 94. The first and second ejection barrels 124, 126 cause the imaging and sensing assemblies 10 to spin and take flight out of the dispenser system 100.

As further shown in FIG. 24, the method 300 further comprises step 314 of capturing an image 92 (see FIG. 14) from a sensor located on the imaging and sensing assembly 10, such as one or more of the plurality of imaging and sensing devices 48 (see FIG. 1), including a sensor, or a camera imaging and sensing device 54 (see FIG. 4), such as, for example, push broom optics with a linear focal plane array. The method 300 may further comprise processing the image 92 with a first processor device 70 (see FIG. 4), such as a computer or microprocessor.

As further shown in FIG. 24, the method 300 further comprises step 316 of communicating the image 92 to a second processor device 74, such as a computer, to at least one of a flight vehicle 16 (see FIG. 14), such as a helicopter 18 (see FIG. 14), or to a third processor device 75 (see FIG. 22) and a ground user 98 (see FIG. 22) at a ground station 99 (see FIG. 22), or to a fourth processor device 77 (see FIG. 22) and a processor communication transmission node 96 (see FIG. 22) in a satellite 97 (see FIG. 22).

Figure 25:
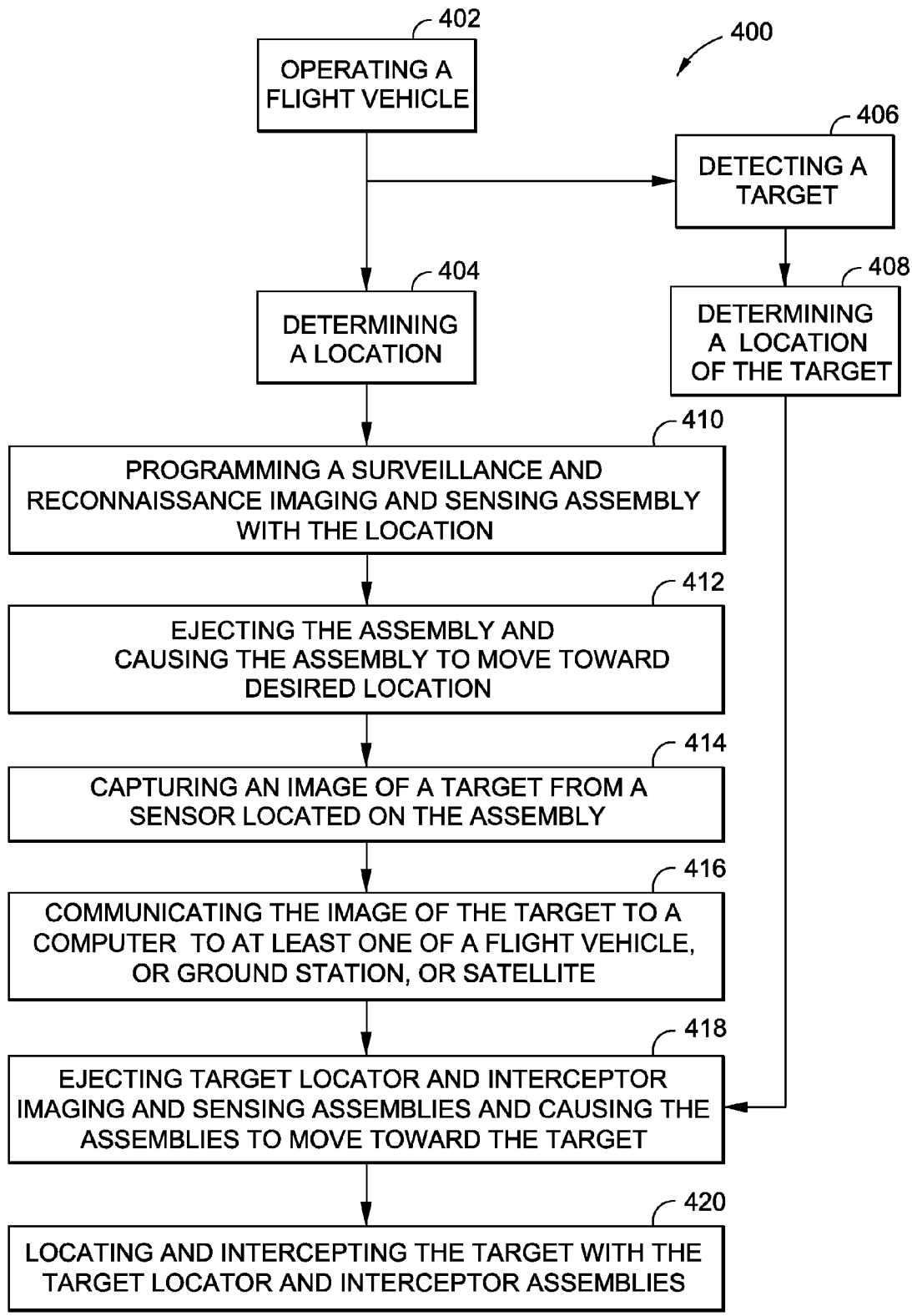
FIG. 25 is an illustration of a schematic diagram showing another embodiment of a method of the disclosure; and, FIG. 26 is an illustration of a flow diagram showing another one of the embodiments of a method of the disclosure.

FIG. 25 is an illustration of a schematic diagram showing another embodiment of a method 400 of the disclosure. The method 400 comprises step 402 of operating a flight vehicle 16 (see FIGS. 14, 17), such as a helicopter 18 (see FIGS. 14, 17), an aircraft, or another flight vehicle 16, where the flight vehicle 16 has a dispenser system 100 (see FIGS. 11, 14) mounted to the flight vehicle 16. The dispenser system 100 is preferably loaded with a plurality of imaging and sensing assemblies 10 (see FIGS. 1-7), as discussed in detail above. The dispenser system 100 comprises a dispenser device 101 (see FIG. 12) having an interior housing portion 115 (see FIG. 12) that houses one or more sensor devices 111 (see FIG. 12), such as optical/IR (infrared) sensor devices, one or more laser illuminator or designator devices 112 (see FIG. 12), one or more radar sensor devices 113 (see FIG. 12), and a communication system 130 (see FIG. 12) comprising one or more radio frequency (RF) antenna devices 117 (see FIG. 12), such as RF patch antenna device, and one or more dispenser processor devices 119 (see FIG. 12).

As shown in FIG. 25, the method 300 further comprises step 404 of determining a location for surveillance or reconnaissance using the one or more sensor devices 111 (see FIG. 12), such as optical/IR (infrared) sensor devices, the one or more laser illuminator or designator devices 112 (see FIG. 12), and/or the one or more radar sensor devices 113 (see FIG. 12) on the dispenser system 100. As further shown in FIG. 25, alternatively, the method 400 further comprises step 406 of detecting a target (see FIG. 23A) using the one or more sensor devices 111 (see FIG. 23A), such as optical/IR (infrared) sensor devices, the one or more laser illuminator or designator devices 112 (see FIG. 12), and/or the one or more radar sensor devices 113 (see FIG. 12), and further comprises step 408 of determining a location 151 (see FIG. 23A) of the target 150 (see FIG. 23A) using the one or more sensor devices 111 (see FIG. 23A), such as optical/IR (infrared) sensor devices, the one or more laser illuminator or designator devices 112 (see FIG. 12), and/or the one or more radar sensor devices 113 (see FIG. 12).

As further shown in FIG. 25, the method 400 further comprises after step 404 of determining a location 151, the step 410 of programming a surveillance and reconnaissance imaging and sensing assembly 11 with the location 151, such as the location 151 of the target 150 (see FIG. 23A), using the communication system 130 (see FIG. 12), the one or more radio frequency (RF) antenna devices 117 (see FIG. 12), such as RF patch antenna devices, and one or more dispenser processor devices 119 (see FIG. 12). The communication system 130 preferably communicates the location 151 of the target 150 to the surveillance and reconnaissance imaging and sensing assembly 11.

As further shown in FIG. 25, the method 400 further comprises step 412 of ejecting one or more surveillance and reconnaissance imaging and sensing assemblies 11 via the first and second ejection barrels 124, 126 (see FIG. 13) from the dispenser system 100 and causing the one or more surveillance and reconnaissance imaging and sensing assemblies 11 to move toward the desired location 151 or target 150. The first and second ejection barrels 124, 126 cause the one or more surveillance and reconnaissance imaging and sensing assemblies 11 to spin and take flight out of the dispenser system 100.

As further shown in FIG. 25, the method 400 further comprises step 414 of capturing an image 92 (see FIG. 14) from a sensor located on the one or more surveillance and reconnaissance imaging and sensing assemblies 11, such as one or more of the plurality of imaging and sensing devices 48 (see FIG. 1), including a sensor, or a camera imaging and sensing device 54 (see FIG. 23A), such as, for example, push broom optics with a linear focal plane array. The method 400 may further comprise processing the image 92 with a first processor device 70 (see FIGS. 4, 23A), such as a computer or microprocessor.

As further shown in FIG. 25, the method 400 further comprises step 416 of communicating the image 92 of the target 150 to a second processor device 74, such as a computer, to at least one of a flight vehicle 16 (see FIG. 14), such as a helicopter 18 (see FIGS. 14, 23A), or to a third processor device 75 (see FIG. 23A) and a ground user 98 (see FIG. 23A) at a ground station 99 (see FIG. 23A), or to a fourth processor device 77 (see FIG. 23A) and a processor communication transmission node 96 (see FIG. 23A) in a satellite 97 (see FIG. 23A).

As further shown in FIG. 25, the method 400 further comprises step 418 of ejecting one or more target locator and interceptor imaging and sensing assemblies 12 (see FIG. 23B) from the dispenser system 100 (see FIG. 23B) and causing the one or more target locator and interceptor imaging and sensing assemblies 12 to move toward the target 150 (see FIG. 23B). As further shown in FIG. 25, the method 400 further comprises step 420 of locating and intercepting the target 150 with the one or more target locator and interceptor imaging and sensing assemblies 12. Such location and interception by the one or more target locator and interceptor imaging and sensing assemblies 12 is discussed in detail above with respect to FIG. 23B.

As an alternative to using the one or more surveillance and reconnaissance imaging and sensing assemblies 11 to detect the target 150 and/or location 151, the method 400 may comprise using the sensor devices 111 of the dispenser system 100 to detect the target 150 and/or location 151. In that instance, as further shown in FIG. 25, after step 408 of determining a location 151 of the target 150, such as with the sensor devices 111 of the dispenser system 100, the method 400 includes going directly to step 418 of ejecting one or more target locator and interceptor imaging and sensing assemblies 12 (see FIG. 23B) from the dispenser system 100 (see FIG. 23B) and causing the one or more target locator and interceptor imaging and sensing assemblies 12 to move toward the target 150 (see FIG. 23B). The method 400 then comprises going to step 420 of locating and intercepting the target 150 with the one or more target locator and interceptor imaging and sensing assemblies 12.

In one embodiment, the imaging and sensing assembly 10 may be preprogrammed with GPS (global positioning system) location information prior to launch. Once launched, a first processor device 70 (see FIG. 22) within the imaging and sensing assembly 10 may determine the current location of the imaging and sensing assembly 10 relative to the destination GPS coordinates. The first processor device 70 may then activate a plurality of pulsed thrusters 40 (see FIGS. 1, 6) on the imaging and sensing assembly 10 to accelerate the imaging and sensing assembly 10 in a different direction. In an alternative embodiment, the imaging and sensing assembly 10 may be launched without a predetermined location. During flight, the plurality of imaging and sensing devices 48 (see FIGS. 2, 6) on the imaging and sensing assembly 10 may capture information relating to the location of the imaging and sensing assembly 10. That information may be transmitted by one or more antenna devices 60 (see FIGS. 1, 7) to a second processor device 74 (see FIG. 22), a third processor device 75 (see FIG. 22), and/or a fourth processor device 77 (see FIG. 22), such as computers, at one or more additional locations. The second processor device 74, third processor device 75, and/or fourth processor device 77, such as computers, may be configured to provide the information in the form of an image 92 (see FIG. 22) or video to a user. The user may then provide control information via the second processor device 74, third processor device 75, and/or fourth processor device 77, such as computers, or a different computer that is configured to transmit the information back to the imaging and sensing assembly 10. The first processor device 70, such as a computer, on the imaging and sensing assembly 10 may then control the plurality of pulsed thrusters 40 based on the information received to redirect the imaging and sensing assembly 10 in flight.

In an alternative embodiment, the imaging and sensing assembly 10 may be launched without a predetermined location. Radar or other sensors located at a location other than the imaging and sensing assembly 10 may track the imaging and sensing assembly 10 during flight. The information received from the radar or sensors may then be transmitted to a computer. The computer may then determine the location of the imaging and sensing assembly 10 and the location 95 of an object 94 (see FIG. 22) or location 151 of a target 150 (see FIG. 23A) for the imaging and sensing assembly 10. The computer may then transmit information to the imaging and sensing assembly 10 where it is received at the antenna. A first processor device 70 on the imaging and sensing assembly 10 may then control the plurality of pulsed thrusters 40 based on the information received to redirect the imaging and sensing assembly 10 in flight.

Disclosed embodiments of the imaging and sensing assembly 10, such as the surveillance and reconnaissance imaging and sensing assembly 11 (see FIGS. 1-5) and the target locator and interceptor imaging and sensing assembly 12 (see FIGS. 6-10), disclosed embodiments of the imaging and sensing assembly dispenser system 100 (see FIGS. 11-13), and disclosed embodiments of method 200 (see FIG. 20), method 210 (see FIG. 21), method 240 (see FIG. 26), method 300 (see FIG. 24) and method 400 (see FIG. 25), may provide assemblies, systems and methods having long range capability, fast response time, accurate interception, stability, multiple simultaneous intercepts from different locations, low profile, and the ability to obtain and transmit high resolution and accurate images of locations, objects, and targets in real time. Further, the assemblies, systems and methods disclosed herein may provide a means to dispense simultaneously from one structure or vehicle, both a device having surveillance and reconnaissance imaging and sensing capabilities and a separate device having target locator and interceptor imaging and sensing capabilities. Moreover, the assemblies, systems and methods disclosed herein may provide an efficient and accurate means to obtain and transmit data in real time for purposes of surveillance, reconnaissance, detecting locations, objects, targets and threats, and intercepting such targets and threats, and may also be capable of delivering a wide range of supplies. In addition, the assemblies, systems and methods disclosed herein may provide access to remote, difficult to reach locations to obtain, collect, and transmit images and other data Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A target locator and interceptor imaging and sensing assembly comprising:
   a disc shaped aerodynamic member configured to spin and self-position in flight;
   a plurality of pulsed thrusters positioned on the aerodynamic member;
   a plurality of imaging and sensing devices positioned along a perimeter of the aerodynamic member;
   one or more munitions devices coupled to one or more detonators, the one or more munitions devices and the one or more detonators being coupled to the aerodynamic member;
   one or more antenna devices positioned on the aerodynamic member and in communication with a first processor device on the aerodynamic member, the first processor device receiving data obtained by the plurality of imaging and sensing devices and wirelessly transmitting the data to a second processor device not positioned on the aerodynamic member; and,
   a power supply powering the target locator and interceptor imaging and sensing assembly.

2. The assembly of claim 1 wherein the one or more munitions devices comprise a plurality of metal pellets, a plurality of metal spheres, a shaped charge, and one or more explosively formed penetrators (EFPs), one or more electro-shock devices, and one or more non-lethal materials such as 2-chlorobenzalmalononitrile (tear gas) gas or powder, pepper spray, chloroacetophenone gas or powder, and dye packets.

3. The assembly of claim 1 wherein the plurality of pulsed thrusters is selected from a group consisting of central thrusters, radial thrusters, torque thrusters, and a combination thereof.

4. The assembly of claim 1 wherein the plurality of imaging and sensing devices is selected from a group consisting of one dimensional imaging and sensing devices, two dimensional imaging and sensing devices, camera imaging and sensing devices including push broom optics with focal plane arrays camera imaging and sensing devices and long term ground surveillance camera imaging and sensing devices, line scan imaging devices including line scan imaging optical cameras, optical and infrared imaging and sensing devices, radar sensing devices, laser scanning devices, and a combination thereof.

5. The assembly of claim 1 wherein the one or more antenna devices comprise one or more of a group consisting of radio frequency antenna devices including radio frequency proximity fuse antenna devices, radio frequency antenna devices for receiving and transmitting data communications, and radio frequency antenna devices for global positioning systems.

6. The assembly of claim 1 wherein the first processor device is selected from a group consisting of a microprocessor, a computer device having one or more microprocessor central processing units (CPUs), a microcomputer device, a computer with a guidance, navigation and control (GN&C) controller, and a combination thereof.

7. The assembly of claim 1 wherein the second processor device is selected from a group consisting of computers such as laptop computers, desktop computers, and notebook computers, a microprocessor, a computer device having one or more microprocessor central processing units (CPUs), a microcomputer device, handheld computer devices such as handheld tablet computers and mobile smartphones, a computer with a guidance, navigation and control (GN&C) controller, and a combination thereof.

8. The assembly of claim 1 wherein the data obtained by the plurality of imaging and sensing devices comprises a plurality of images including video images and high resolution streaming optical/IR (infrared) video images, raw data, radar images, microwave images, and a combination thereof.

9. The assembly of claim 1 wherein the power supply comprises one or more of a group consisting of one or more batteries, one or more solar panels, solar cells, solar modules, multi-junction solar cells, fuel cells, an internal combustion engine powered generator system, and a combination thereof.

10. A target locator and interceptor imaging and sensing assembly dispenser system, the dispenser system comprising:
    a dispenser device having a plurality of storage slots extending from a position near a central portion of the dispenser device to an external surface of the dispenser device, at least one storage slot shaped to house an imaging and sensing assembly having a disc shaped aerodynamic member;
    a communication system coupled to the dispenser device and configured to communicate data between the dispenser device and the imaging and sensing assembly; and,
    at least one ejection device to eject the imaging and sensing assembly out of the dispenser device.

11. The system of claim 10 wherein the dispenser system further comprises multiple sensor devices including optical/IR (infrared) sensor devices, radar sensor devices, and laser illuminator devices housed in the dispenser device.

12. The system of claim 10 wherein the at least one ejection device comprises a launcher barrel, an ejection charge, and a rack and pinion device and a belt device to spin the imaging and sensing assembly.

13. The system of claim 10 wherein the communication system comprises one or more antenna devices coupled to the dispenser device and one or more dispenser processor devices coupled to the dispenser device.

14. The system of claim 10 wherein the imaging and sensing assembly comprises a target locator and interceptor imaging and sensing assembly comprising:
    the disc shaped aerodynamic member configured to spin and self-position in flight;
    a plurality of pulsed thrusters positioned on the aerodynamic member;
    a plurality of imaging and sensing devices positioned along a perimeter of the aerodynamic member;
    one or more munitions devices coupled to one or more detonators, the one or more munitions devices and the one or more detonators being coupled to the aerodynamic member;
    one or more antenna devices positioned on the aerodynamic member and in communication with a first processor device on the aerodynamic member, the first processor device receiving data obtained by the plurality of imaging and sensing devices and wirelessly transmitting the data to a second processor device not positioned on the aerodynamic member; and,
    a power supply powering the target locator and interceptor imaging and sensing assembly.

15. A method for locating and intercepting a target, the method comprising:
    ejecting a surveillance and reconnaissance imaging and sensing assembly from a dispenser system attached to a structure, the surveillance and reconnaissance imaging and sensing assembly having a disc shaped aerodynamic member;
    spinning the disc shaped aerodynamic member while in flight;
    obtaining data from a plurality of imaging and sensing devices on the surveillance and reconnaissance imaging and sensing assembly;
    transmitting the data to a second processor device for processing to obtain processed data;
    identifying a target from the processed data;
    detecting the target with one or more sensor devices of the dispenser system;
    ejecting one or more target locator and interceptor imaging and sensing assemblies from the dispenser system toward the target; and,
    locating and intercepting the target with the one or more target locator and interceptor imaging assemblies.

16. The method of claim 15 further comprising prior to ejecting the surveillance and reconnaissance imaging and sensing assembly from the dispenser system, attaching the dispenser system to a flight vehicle and housing the second processor device in the flight vehicle.

17. The method of claim 15 further comprising prior to obtaining data from the plurality of imaging and sensing devices, using a radio frequency antenna device for a global positioning system to guide the surveillance and reconnaissance imaging and sensing assembly to a precise location.

18. The method of claim 15 wherein the obtaining data from the plurality of imaging and sensing devices further comprises obtaining a plurality of images via one or more camera imaging and sensing devices including push broom optics with a linear focal plane array.

19. The method of claim 15 wherein the transmitting the data to the second processor device further comprises delivering high resolution streaming optical/IR (infrared) video images of one or more objects or locations not in view of one or more occupants in a flight vehicle.

20. The method of claim 15 wherein the locating and intercepting the target with the one or more target locator and interceptor imaging assemblies comprises detonating one or more munitions devices on the one or more target locator and interceptor imaging assemblies and driving a plurality of high density metal pellets onto the target in order to disable the target.

21. The method of claim 15 wherein the surveillance and reconnaissance imaging and sensing assembly comprises:
    a disc shaped aerodynamic member configured to spin and self-position in flight;
    a plurality of pulsed thrusters positioned on the aerodynamic member;
    a plurality of imaging and sensing devices positioned along a perimeter of the aerodynamic member; and,
    one or more antenna devices positioned on the aerodynamic member and in communication with a first processor device on the aerodynamic member.

22. The method of claim 15 wherein the target locator and interceptor imaging and sensing assembly comprises:
    a disc shaped aerodynamic member configured to spin and self-position in flight;
    a plurality of pulsed thrusters positioned on the aerodynamic member;
    a plurality of imaging and sensing devices positioned along a perimeter of the aerodynamic member;
    one or more munitions devices coupled to one or more detonators, the one or more munitions devices and the one or more detonators being coupled to the aerodynamic member;
    one or more antenna devices positioned on the aerodynamic member and in communication with a first processor device on the aerodynamic member, the first processor device receiving data obtained by the plurality of imaging and sensing devices and wirelessly transmitting the data to a second processor device not positioned on the aerodynamic member; and, a power supply powering the target locator and interceptor imaging and sensing assembly.

23. A method for locating and intercepting a target, the method comprising:

rotating a dispenser system attached to a structure, the dispenser system housing a plurality of target locator and interceptor imaging and sensing assemblies;

detecting a target with one or more sensor devices of the dispenser system;

ejecting one or more of the target locator and interceptor imaging and sensing assemblies from the dispenser system toward the target; and, locating and intercepting the target with the one or more target locator and interceptor imaging assemblies.

24. The method of claim 23 wherein the locating and intercepting the target with the one or more target locator and interceptor imaging assemblies comprises detonating the one or more munitions devices with the one or more detonators and driving a plurality of high density metal pellets onto the target in order to disable the target.

25. The method of claim 23, wherein the target locator and interceptor imaging and sensing assembly comprises:

a disc shaped aerodynamic member configured to spin and self-position in flight;

a plurality of pulsed thrusters positioned on the aerodynamic member;

a plurality of imaging and sensing devices positioned along a perimeter of the aerodynamic member;

one or more munitions devices coupled to one or more detonators, the one or more munitions devices and the one or more detonators being coupled to the aerodynamic member;

one or more antenna devices positioned on the aerodynamic member and in communication with a first processor device on the aerodynamic member, the first processor device receiving data obtained by the plurality of imaging and sensing devices and wirelessly transmitting the data to a second processor device not positioned on the aerodynamic member; and, a power supply powering the target locator and interceptor imaging and sensing assembly.

* * * * *